United States Patent
Lemon et al.

(10) Patent No.: US 12,272,358 B1
(45) Date of Patent: Apr. 8, 2025

(54) ENHANCED GRAPHICAL USER INTERFACE FOR VOICE COMMUNICATIONS

(71) Applicant: Amazon Technologies, Inc., Seattle, WA (US)

(72) Inventors: Sandra Lemon, Bothell, WA (US); Nancy Yi Liang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 107 days.

(21) Appl. No.: 18/105,114

(22) Filed: Feb. 2, 2023

Related U.S. Application Data

(63) Continuation of application No. 16/586,457, filed on Sep. 27, 2019, now Pat. No. 11,574,633, which is a
(Continued)

(51) Int. Cl.
| | |
|---|---|
| *G10L 15/22* | (2006.01) |
| *G06F 3/04817* | (2022.01) |
| *G06F 3/0482* | (2013.01) |
| *G06F 3/0488* | (2022.01) |
| *G06F 40/109* | (2020.01) |
| *G06F 40/40* | (2020.01) |
| *G06F 40/47* | (2020.01) |
| *G06F 40/58* | (2020.01) |
| *G06V 40/20* | (2022.01) |

(Continued)

(52) U.S. Cl.
CPC .......... *G10L 15/22* (2013.01); *G06F 3/04817* (2013.01); *G06F 3/0482* (2013.01); *G06F 3/0488* (2013.01); *G06F 40/109* (2020.01); *G06F 40/40* (2020.01); *G06F 40/58* (2020.01); *G06V 40/28* (2022.01); *G10L 15/26* (2013.01); *G10L 25/81* (2013.01); *G10L 25/90* (2013.01); *H04N 7/185* (2013.01); *G06F 40/47* (2020.01); *G10L 2015/223* (2013.01)

(58) Field of Classification Search
CPC ......... G10L 15/22; G10L 15/26; G06F 17/28; G06F 17/289; G06F 17/2836
See application file for complete search history.

(56) References Cited

U.S. PATENT DOCUMENTS

| | | | |
|---|---|---|---|
| 6,266,642 B1 * | 7/2001 | Franz | G06F 40/211 704/277 |
| 7,197,122 B2 * | 3/2007 | Vuori | H04W 4/14 379/201.1 |

(Continued)

OTHER PUBLICATIONS

Office Action for U.S. Appl. No. 16/586,457, mailed Jan. 13, 2022, Lemon, "Enhanced Graphical User Interface for Voice Communications", 31 pages.
(Continued)

*Primary Examiner* — Samuel G Neway
(74) *Attorney, Agent, or Firm* — Nicholson De Vos Webster & Elliott LLP

(57) ABSTRACT

Enhanced graphical user interfaces for transcription of audio and video messages is disclosed. Audio data may be transcribed, and the transcription may include emphasized words and/or punctuation corresponding to emphasis of user speech. Additionally, the transcription may be translated into a second language. A message spoken by a user depicted in one or more images of video data may also be transcribed and provided to one or more devices.

20 Claims, 19 Drawing Sheets

Related U.S. Application Data continuation of application No. 15/394,433, filed on Dec. 29, 2016, now Pat. No. 10,431,216.

(51) Int. Cl.
*G10L 15/26* (2006.01)
*G10L 25/81* (2013.01)
*G10L 25/90* (2013.01)
*H04N 7/18* (2006.01)

(56) References Cited

U.S. PATENT DOCUMENTS

| | | | | |
|---|---|---|---|---|
| 8,874,429 | B1* | 10/2014 | Crosley | H04N 5/05 348/14.08 |
| 9,053,097 | B2 | 6/2015 | Zivkovic | |
| 9,400,788 | B2* | 7/2016 | Davis | H04L 51/046 |
| 10,431,216 | B1* | 10/2019 | Lemon | G06F 3/017 |
| 11,574,633 | B1* | 2/2023 | Lemon | G06F 40/40 |
| 2002/0010590 | A1* | 1/2002 | Lee | G06F 40/58 704/277 |
| 2002/0046035 | A1* | 4/2002 | Kitahara | G10L 15/1822 704/277 |
| 2003/0046071 | A1* | 3/2003 | Wyman | G10L 15/22 704/E15.04 |
| 2003/0125927 | A1* | 7/2003 | Seme | H04L 51/063 704/3 |
| 2005/0261890 | A1* | 11/2005 | Robinson | G06F 40/58 704/9 |
| 2006/0133585 | A1* | 6/2006 | Daigle | G06F 40/263 379/88.06 |
| 2006/0224378 | A1* | 10/2006 | Chino | G06F 40/30 704/2 |
| 2007/0061152 | A1* | 3/2007 | Doi | G10L 15/26 704/277 |
| 2008/0077387 | A1* | 3/2008 | Ariu | G10L 15/22 704/E15.04 |
| 2008/0153459 | A1 | 6/2008 | Kansal et al. | |
| 2009/0252305 | A1 | 10/2009 | Rohde et al. | |
| 2009/0313007 | A1* | 12/2009 | Bajaj | G06F 40/58 704/3 |
| 2010/0121629 | A1* | 5/2010 | Cohen | G06Q 40/12 704/235 |
| 2010/0185434 | A1* | 7/2010 | Burvall | G10L 15/005 704/3 |
| 2011/0252316 | A1* | 10/2011 | Pahud | G06F 40/58 715/753 |
| 2012/0110085 | A1 | 5/2012 | Malik et al. | |
| 2012/0284014 | A1* | 11/2012 | Zivkovic | G06F 40/58 704/3 |
| 2013/0238312 | A1* | 9/2013 | Waibel | G06F 40/117 704/8 |
| 2014/0075328 | A1 | 3/2014 | Hansen et al. | |
| 2014/0180668 | A1* | 6/2014 | Nasu | G06F 40/40 704/2 |
| 2014/0242955 | A1* | 8/2014 | Kang | G06F 40/58 455/414.1 |
| 2014/0278346 | A1* | 9/2014 | Zomet | G06F 40/58 704/3 |
| 2014/0288919 | A1* | 9/2014 | LeBeau | G06F 40/58 704/2 |
| 2014/0303957 | A1* | 10/2014 | Lee | G06F 40/58 704/2 |
| 2014/0303958 | A1* | 10/2014 | Lee | G06F 40/58 704/2 |
| 2015/0081274 | A1* | 3/2015 | Kawamura | G06F 40/58 704/3 |
| 2015/0088485 | A1* | 3/2015 | Alhabobi | H04L 65/403 704/2 |
| 2015/0134322 | A1* | 5/2015 | Cuthbert | G06F 40/58 704/3 |
| 2015/0154183 | A1* | 6/2015 | Kristjansson | H04N 7/15 704/E13.001 |
| 2015/0287409 | A1* | 10/2015 | Jang | G11B 27/031 704/235 |
| 2016/0020917 | A1 | 1/2016 | Tuatini et al. | |
| 2016/0048503 | A1* | 2/2016 | Liang | G10L 15/26 704/3 |
| 2016/0085747 | A1* | 3/2016 | Kamatani | G06F 40/58 704/277 |
| 2016/0147740 | A1* | 5/2016 | Gao | G10L 15/063 704/2 |
| 2016/0170970 | A1* | 6/2016 | Lindblom | G10L 21/003 704/3 |
| 2016/0343272 | A1* | 11/2016 | Roche | G09B 5/04 |
| 2017/0148436 | A1* | 5/2017 | Sugiura | G06F 40/58 |
| 2017/0270103 | A1* | 9/2017 | Golan | H04W 4/02 |

OTHER PUBLICATIONS

Final Office Action dated Oct. 25, 2019 for U.S. Appl. No. 15/442,465 "Messaging Content Data Storage" Srinivasan, 13 pages.
Office Action for U.S. Appl. No. 15/442,465, mailed on Oct. 30, 2020, Srinivasan, "Messaging Content Data Storage ", 16 Pages.
Office Action for U.S. Appl. No. 16/586,457, mailed on Oct. 8, 2021, Lemon, "Enhanced Graphical User Interface for Voice Communications", 27 pages.
Non Final Office Action mailed Nov. 16, 2018 for U.S. Appl. No. 15/394,433 "Enhanced Graphical User Interface for Voice Communications" Lemon, 15 pages.
Office Action for U.S. Appl. No. 15/442,465, mailed on Apr. 27, 2021, Srinivasan, "Messaging Content Data Storage " 14 pages.
Office Action for U.S. Appl. No. 15/442,465, mailed on May 6, 2019, Srinivasan, "Messaging Content Data Storage", 12 pages.
Office Action for U.S. Appl. No. 16/586,457, mailed Jun. 14, 2022, Lemon, "Enhanced Graphical User Interface for Voice Communications", 7 pages.
Office Action for U.S. Appl. No. 16/586,457, mailed on Jun. 8, 2021, Lemon, "Enhanced Graphical User Interface for Voice Communications", 25 pages.
Open Mobile Alliance, "MMS Conformance Document", 2005, pp. 1-82.

* cited by examiner

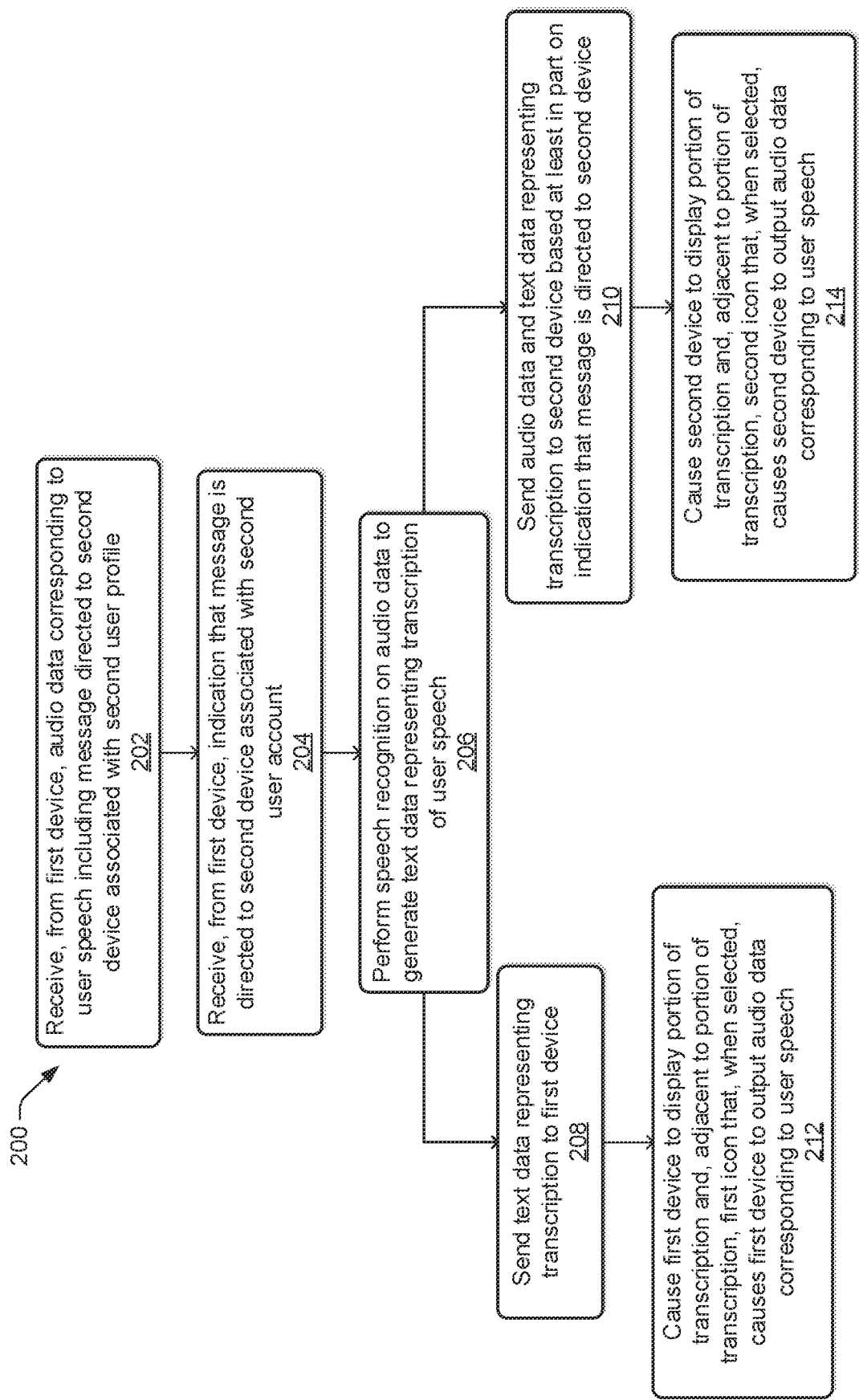

ENHANCED GRAPHICAL USER INTERFACE FOR VOICE COMMUNICATIONS

RELATED APPLICATIONS

This application claims priority to and is a continuation of U.S. patent application Ser. No. 16/586,457, filed on Sep. 27, 2019, which will issue as U.S. Pat. No. 11,574,633 on Feb. 7, 2023, which claims priority to and is a continuation of U.S. patent application Ser. No. 15/394,433, filed on Dec. 29, 2016, now known as U.S. Pat. No. 10,431,216, which issued on Oct. 1, 2019, the entire contents of which are incorporated herein by reference.

BACKGROUND

Mobile device users communicate with each other by text messaging, telephone calls, and live streaming video calls. Provided herein are technical solutions to enable mobile devices and other types of devices to solve technical problems to improve communication experiences.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a flow diagram of an example process for transcribing audio data.

DETAILED DESCRIPTION

Figure 1A:
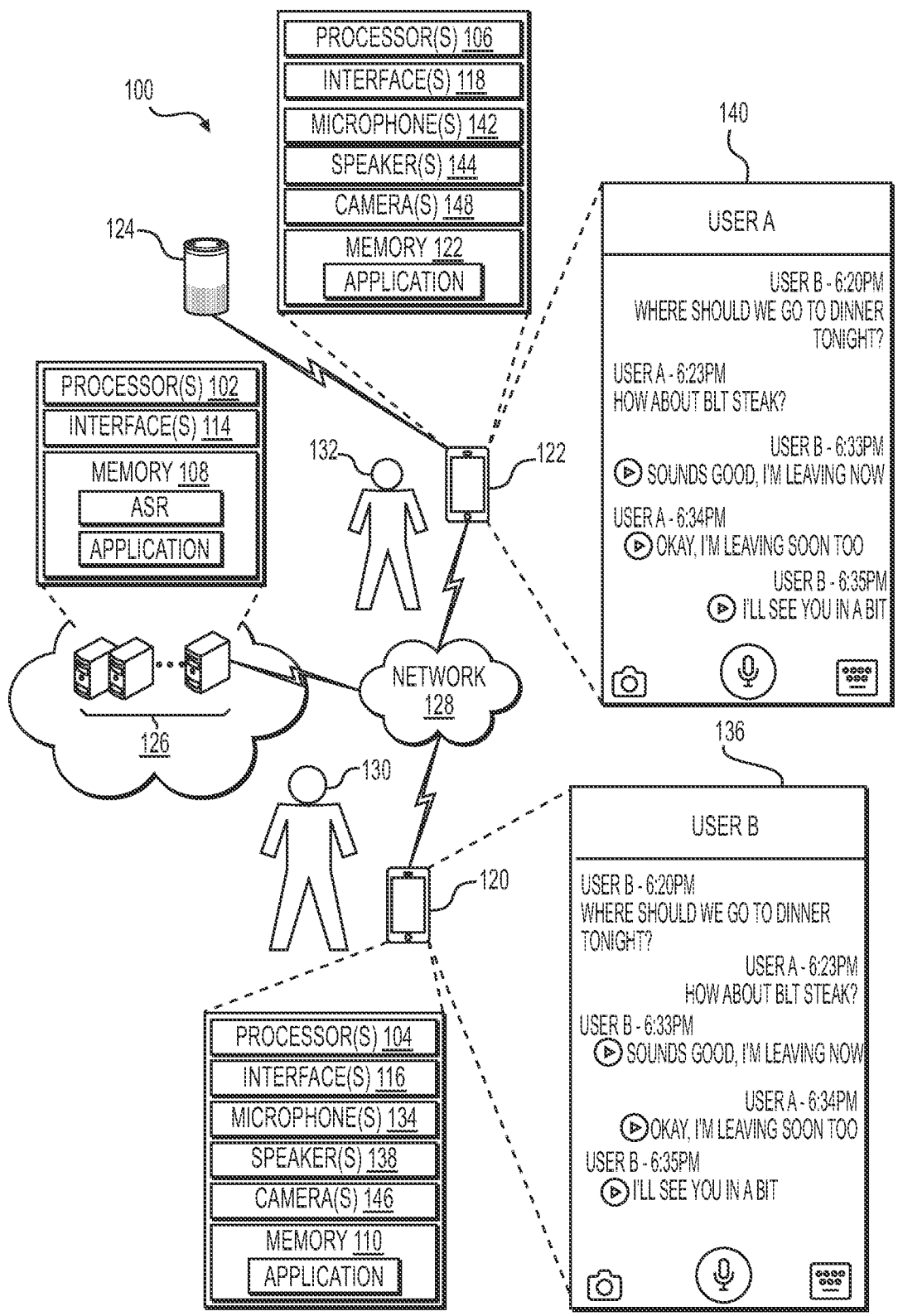
FIG. 1a illustrates a schematic diagram of an example system for communication transcription.

Systems and methods for enhanced graphical user interfaces for voice communication are disclosed. Communication means have expanded with the advent of mobile devices. These communication means include text messaging, telephone calling, and live video streaming. The systems and methods described herein provide a user experience for transcribing audio and/or video messages and providing mobile devices and other types of devices with enhanced transcriptions. The enhanced transcriptions may include visual emphasis indicators, language translations, and video message transcriptions. By so doing, the present systems and methods allow users to send and receive transcriptions in a manner that mimics live conversation.

For example, envision a first user profile associated with User A who desires to communicate with a second user profile associated with User B. User A may operate her device to open a messaging application that allows her to choose to send a text message or a voice message to a device associated with User B's profile. In the latter instances, User A presses an icon or the like and a microphone from User A's device generates audio data that is sent to a remote system, for example, for performing automatic speech recognition thereon. The remote system may then send the transcription to User A's device and User B's device for presentation in respective messaging windows. In addition, the remote system may send the audio data to User B's device such that User B may choose to listen to the voice message.

The application may include a messaging window that shows both the text messages sent and received back and forth, as well as transcriptions of any messages. For instance, User A's device and/or User B's device may present an icon that, when selected, may cause output of the audio corresponding to the audio data on a speaker of the device receiving the selection. For example, if User B sent a voice message saying "Congratulations," then the remote system may send text data representing this transcription to both devices while also sending the actual voice message to User B's device. User B's device may present the transcription adjacent to an icon indicating that User A has recorded a message for User B. When the icon is selected, User B's device may output, via speakers of the device, the audio corresponding to the audio data, such as User A stating "Congratulations."

The application and/or the remote system may provide a range of additional, or alternative, functionalities to users. These functionalities may include enhanced transcription of audio messages that display emphasized words and/or phrases in the transcription that correspond to emphasized words and/or phrases in user speech. Additionally, or alternatively, a user sending an audio message may indicate that the transcription of the message should be presented in another language. The application and/or the remote system may translate the transcription and provide text representing a translated transcription to the recipient. The application and/or the remote system may also allow for transcription of messages in video data. The messages may be verbal messages and/or sign language.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1a illustrates an example of an enhanced transcription system 100 and multiple devices that may utilize system 100. System 100 may include one or more processors. As used herein, a processor, such as processor(s) 102, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 104, and/or 106 may possess its own local memory, which also may store program components, program data, and/or one or more operating systems.

System 100 may also include memory memory 108, 110, and/or 112. Memory 108, memory 110, and/or memory 112 may include volatile and nonvolatile memory, removable and non-removable media implemented in any method or technology for storage of information, such as computer-readable instructions, data structures, program component, or other data. Such memory 108, 110, and/or 112 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 110, and/or 112 may be implemented as computer-readable storage media ("CRSM"), which may be any available physical media accessible by the processor(s) 102, 104, and/or 106 to execute instructions stored on the memory 108, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD™ operating system as promulgated by the FreeBSD Project: other UNIX or UNIX-like variants: a variation of the Linux operating system as promulgated by Linus Torvalds; the FireOS operating system from Amazon.com Inc. of Seattle, Washington, US: the Windows® operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

Each of the network interface(s) 114, network interface(s) 116, and network interface(s) 118 may enable communications between a first device 120, a second device 122, a third device 124, and a remote system 126, as well as other networked devices. Such network interface(s) can include one or more network interface controllers (NICs) or other types of transceiver devices to send and receive communications over a network.

For instance, each of the network interface(s) 114, network interface(s) 116, and network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114, network interface(s) 116, and network interface(s) 118 may include a wide area network (WAN) component to enable communication over a wide area network. The network 128 may represent an array of wired networks, wireless networks, such as WiFi, or combinations thereof.

In some instances, the remote system 126 may be local to an environment associated the first device 120, the second device 122, and/or the third device 124. For instance, the remote system 126 can be located within the third device 124. In some instances, some or all of the functionality of the remote system 126 may be performed by one or more of the first device 120, the second device 122, and/or the third device 124.

In some instances, the remote system 126 is configured to receive, from the first device 120 associated with a first user 130, audio data corresponding to user speech. The user speech may include a message directed to a second user 132 associated with a second user profile and/or account and/or the second device 122. The audio data may be generated by at least one microphone 134 associated with the first device 120. The audio data may include the user speech and other components, such as, for example, background noise. In some instances, the user speech may be a message directed to the second user 132 and/or the second user profile and/or account of the second device 122.

The remote system 126 may be further configured to analyze the audio data to create a transcription of the user speech. For example, once the audio data is received from the first device 120, the portion of the audio data corresponding to the user speech may be separated from other components of the audio data, such as, for example, background noise. Automatic speech recognition (ASR) techniques may be used to determine or identify words making up the user speech. For example, ASR techniques may include generation of a list that includes the most likely words or phrases spoken by the user, an "N-best list" for example, and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings. The techniques may also include determining characteristics of the user speech. The characteristics may include at least one of volume changes, pitch changes, or inflection changes of the user speech. For example, volume changes may be determined based at least in part on signal strength variation corresponding to the volume at which the user is speaking. By way of further example, pitch changes may be determined base at least in part on frequency and/or amplitude changes in the audio data corresponding to changes in voice tones by the user. Additionally, or alternatively, inflection changes of the user speech may be determined based at least in part on components of the audio data corresponding to voice attributes of the user, such as, for example, tense, mood, rhythm, accent, cadence, stress, and tone. Other attributes, such as intonation, emphasis, modulation, lilt, and gender may also be determined. The volume changes, pitch changes, and/or infliction changes may be associated with specific words or phrases in the message such that words or phrases emphasized by the user while speaking are represented as emphasized words in the transcription. The techniques may determine at least one of emphasized words or punctuation for the transcription based at least in part on the characteristics.

The remote system 126 may be further configured to send the audio data and text data representing the transcription to a first user interface 136 of the first device 120. The first user interface 136 may be the same or a different user interface that was used to record the audio. Sending the text data representing the transcription to the first user interface 136 may cause the first device 120 to display the transcription, or a portion thereof, on the first user interface 136. The transcription may be displayed as typed text. Sending the audio data to the first user interface 136 may also cause the first device 120 to display an icon corresponding to the audio data on the first user interface 136. The icon, when selected by the first user 130, may cause one or more speakers 138 to output the audio associated with the audio data.

The transcription may be displayed with the emphasized words and/or punctuation determined via speech recognition. Display of the emphasized words may be by, for example, highlighting, underlining, italicizing, bolding, changing of font size, changing of font style, and/or changing of font color. Display of punctuation may follow conventional grammar rules for emphasizing text. For example, in instances where excitement is determined from the characteristics of the audio data, an exclamation point may be inserted into the transcription. Additionally, or alternatively, in instances where the characteristics indicate that the user is asking a question, a question mark may be inserted into the transcription, by way of example. Additional punctuation may be included, such as quotation marks, commas, and periods, for example.

The remote system 126 may be further configured to send the audio data and/or the text data representing the transcription to a second user interface 140 of the second device 122. Sending the text data representing the transcription to the second user interface 140 may cause the second device 122 to display the transcription, or a portion thereof, on the second user interface 140. The transcription may be displayed as typed text and may include the emphasized words and/or punctuation as described herein. Sending the audio data to the second user interface 140 may also cause the second device 122 to display an icon corresponding to the audio data on the second user interface 140. The icon, when selected by the second user 132, may cause one or more speakers 144 to output the audio associated with the audio data. Additionally, or alternatively, the audio associated with the audio data may be output by a device, such as the third device 124, connected, via wired or wireless communication, to the second device 122. The third device 124 may output the audio upon receipt of the audio data by the second device 122, by selection of the icon by the second user 132, by selection of the transcription by the second user 132, and/or by a command provided by the second user 132, such as, for example, an audible command.

In some instances, the remote system 126 may be configured to identify one or more additional devices associated with the second user 132 and send the audio data and/or text data representing the transcription to the one or more additional device. Additionally, or alternatively, the remote system 126 may receive an indication that the second device 122 is in a mute mode. In response to the indication that the second device 122 is in the mute mode, the audio data may not be sent to the second device 122 and/or selection of the icon for output of the audio may be disabled. Additionally, or alternatively, receiving the indication of the mute mode may cause the remote system 126 to send the text data representing the transcription to the second device 122.

In some instances, the remote system 126 may send the audio data and text data representing the transcription to the second device 122 based at least in part on an indication from the first user 130 that the audio is directed to or intended for the second user 132. The indication may include an instruction from the first device 120 to send the audio data and the text representing the transcription to the second device 122. The instruction may correspond to the user selecting the name of the second user 132 from a list of contacts and/or selecting a profile and/or account associated with the second user 132. The instruction may also correspond to the first user 130 speaking or otherwise entering a command to send the audio data and/or to start a conversation with second user 132 and/or the second user's profile and/or account.

In some instances, the transcription may be selectable by the second user 132, and when selected, may cause the one or more speakers 144 to output the audio associated with the audio data. Display of the transcription may change as the audio is output. For example, the text of the transcription may be altered as audio corresponding to that text is output.

Altering the text may be performed by, for example, highlighting, italicizing, underlining, changing font style, changing font size, changing font color, and/or capitalization.

The remote system 126 may be further configured to receive, from the second device 122, second audio data corresponding to second user speech from the second user 132. The second audio data may be generated by one or more microphones 142 of the second device 122. The second user speech may include a message to be sent to the first user 130. The message may be in response to the audio data or the text data representing the transcription of the audio data sent by the first user 130 and/or first user profile and/or account. The remote system 126 may analyze the second audio data to generate second text data representing a second transcription of the second user speech. The second text data representing the second transcription may be generated in a similar manner to the transcription of the audio data described herein. The remote system 126 may send the second audio data and the second text data representing the second transcription to the first user interface 136 and to the second user interface 140. Sending the second text data representing the second transcription to the first user interface 136 and the second user interface 140 may cause the first device 120 and/or the second device 122 to display the transcription, or a portion thereof, on the first user interface 136 and the second user interface 140, respectively. Additionally, sending the second audio data to the first user interface 136 and the second user interface 140 may cause the first device 120 and/or the second device 122 to display icons on the first user interface 136 and/or the second user interface 140, respectively. The icons may correspond to the second audio data. Selection of the icons by the first user 130 and/or the second user 132 may cause the audio associated with the audio data to be output by the one or more speakers 138 of the first device 120 and/or the one or more speakers 144 of the second device 122.

Additional audio data may be received and sent between the first device 120 and the second device 122. Text data representing transcriptions corresponding to the additional audio data may be generated and sent to the first device 120 and the second device 122.

Additionally, or alternatively, the memory 110 on the first device 120 may, when executed by the processor(s) 104, cause the processor(s) 104 to perform operations such as presenting the first user interface 136 on the first device 120. The operations may also include causing one or more microphones 134 to capture audio corresponding to user speech and generate audio data corresponding to the audio. The operations may further include sending the audio data to one or more processors, such as processor(s) 102 of remote system 126. The operations may also include receiving, from the one or more processors, a transcription of the audio data and displaying the transcription, or a portion thereof, on the first user interface 136 along with an icon corresponding to the audio data. The transcription may include emphasized words and/or punctuation as described herein.

The operations may also include causing the transcription and the audio data to be sent to the second device 122 to be displayed on the second user interface 140. The operations may further include receiving, from one or more processors, such as processor(s) 102, second audio data corresponding to user speech recorded using the second device 122 and a second transcription corresponding to the second audio data. The operations may further include displaying the second transcription, or a portion thereof, and an icon corresponding to the second audio data on the first user interface 136. Audio corresponding to the second audio data may be output by the one or more speakers 138 based at least in part on selection by the first user 130 of the icon corresponding to the second audio data.

Additionally, or alternatively, the memory 108 of the remote system 126 may, when executed by the processor(s) 102, cause the processor(s) 102 to perform operations such as receiving, from the first device 120 of a first user 130, audio data corresponding to user speech in a first language. The user speech may include a message directed to the second device 122 associated with the second user 132. The operations may also include receiving, from the first device 120, a first indication that the message is directed to the second device 122. The operations may further include receiving, from the first device 120, a second indication of a second language for the message to be translated to. The operations may include performing speech recognition on the audio data to generate text data representing a transcription of the user speech and performing translation of the transcription to the second language to generate text data representing a translated transcription. In some examples, the text data representing the transcription may first be generated in the first language and then translated to the second language. In other examples, the text data representing the transcription may first be generated in the second language such that only one transcription is generated.

The remote system 126 may be further configured to send the audio data and the text data representing the translated transcription to a first user interface 136 of the first device 120. The first user interface 136 may be the same or a different user interface that was used to record the audio. Sending the text data representing the translated transcription to the first user interface 136 may cause the first device 120 to display the translated transcription, or a portion thereof, on the first user interface 136. The translated transcription may be displayed as typed text or characters. Sending the audio data to the first user interface 136 may also cause the first device 120 to display an icon corresponding to the audio data on the first user interface 136. The icon, when selected by the first user 130, may cause one or more speakers 138 to output the audio associated with the audio data.

The remote system 126 may be further configured to send the audio data and/or the text data representing the translated transcription to a second user interface 140 of the second device 122. Sending the text data representing the translated transcription to the second user interface 140 may cause the second device 122 to display the translated transcription, or a portion thereof, on the second user interface 140. The translated transcription may be displayed as typed text or characters. Sending the audio data to the second user interface 140 may also cause the second device 122 to display an icon corresponding to the audio data on the second user interface 140. The icon, when selected by the second user 132, may cause one or more speakers 144 to output the audio associated with the audio data. Additionally, or alternatively, the audio associated with the audio data may be output by a device, such as the third device 124, connected, via wired or wireless communication, to the second device 122. The third device 124 may output the audio upon receipt of the audio data by the second device 122, by selection of the icon by the second user 132, by selection of the translated transcription by the second user 132, and/or by a command provided by the second user 132, such as, for example, an audible command. The audio may be output in the first language or the second language.

Additional audio data may be received and sent between the first device 120 and the second device 122. Text data representing transcriptions corresponding to the additional audio data may be generated and sent to the first device 120 and the second device 122.

Additionally, or alternatively, the memory 108 on the remote system 126 may, when executed by the processor(s) 102, cause the processor(s) 102 to perform operations such as receiving, from the first device 120 associated with a first profile and/or account of a first user 130, video data corresponding to one or more images captured by a camera 146 of the first device 120. The images may depict the first user 130 providing a message directed to the second device 122 associated with the second user 132, who may be associated with a second user profile and/or second user account. The operations may also include receiving, from the first device 120, an indication that the message is directed to the second device 122. The operations may further include generating text data representing a transcription of the message based at least in part on analysis of the video data.

The remote system 126 may be further configured to send the video data and the text data representing the transcription to a first user interface 136 of the first device 120. The first user interface 136 may be the same or a different user interface that was used to record the video. Sending the text data representing the transcription to the first user interface 136 may cause the first device 120 to display the transcription, or a portion thereof, on the first user interface 136. The transcription may be displayed as typed text. Sending the video data to the first user interface 136 may also cause the first device 120 to display an icon corresponding to the video data on the first user interface 136. The icon, when selected by the first user 130, may cause display of the video associated with the video data. Selection of the icon may also cause the speaker(s) 138 of the first device 120 to output audio associated with the video data.

The remote system 126 may be further configured to send the video data and/or the text data representing the transcription to a second user interface 140 of the second device 122. Sending the text data representing the transcription to the second user interface 140 may cause the second device 122 to display the transcription, or a portion thereof, on the second user interface 140. The transcription may be displayed as typed text. Sending the video data to the second user interface 140 may also cause the second device 122 to display an icon corresponding to the video data on the second user interface 140. The icon, when selected by the second user 132, may cause display of the video associated with the video data. Additionally, or alternatively, audio associated with the video data may be output by speaker(s) 144 of the second device 122.

Additional video data may be received and sent between the first device 120 and the second device 122. Text data representing transcriptions corresponding to the additional video data may be generated and sent to the first device 120 and the second device 122.

Figure 1B:
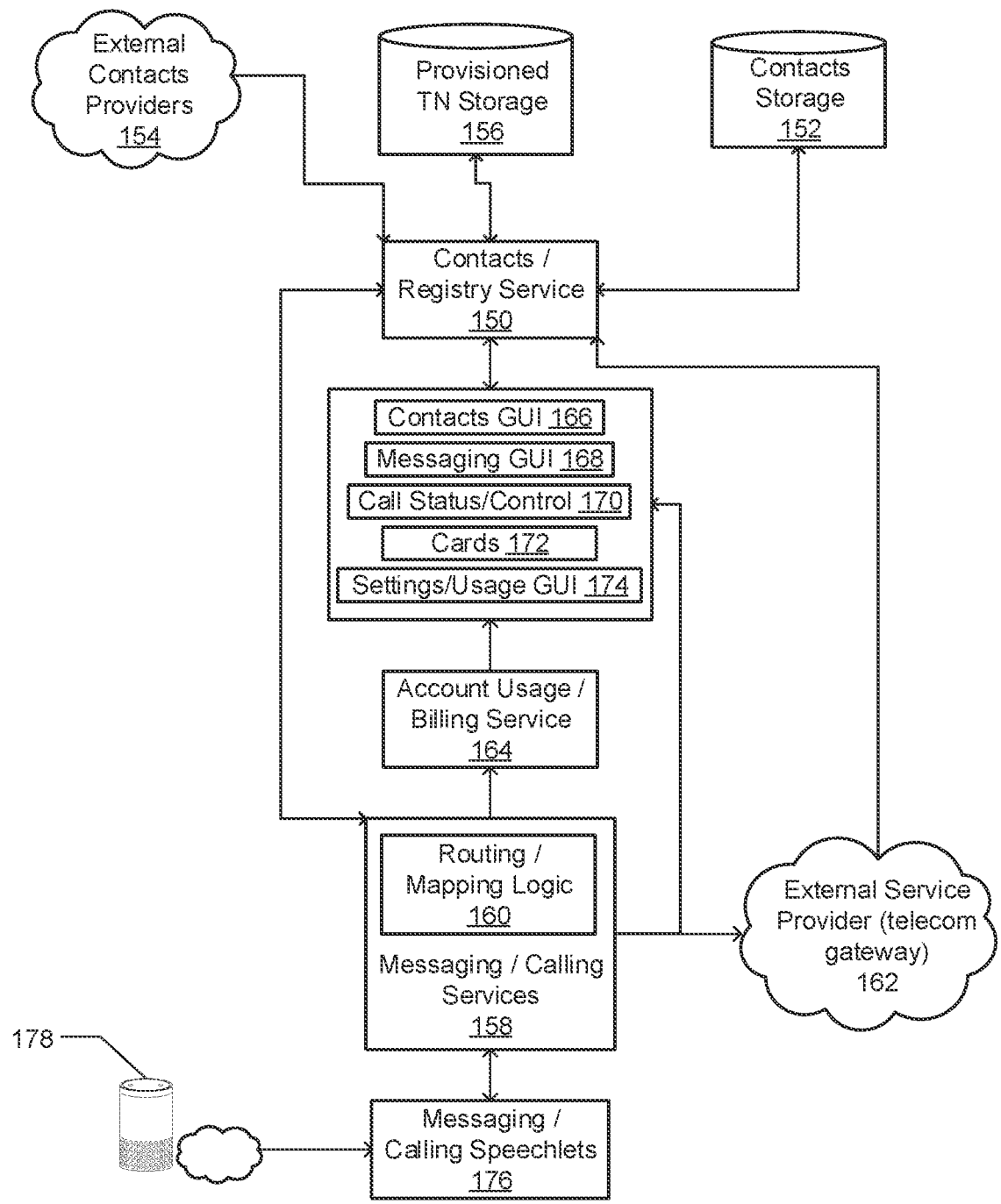
FIG. 1b illustrates a schematic diagram of an example communication design for communication transcription.

FIG. 1*b* illustrates a schematic diagram of an example communication design for communication transcription. The design may include an architecture that may apply to calling and/or messaging and/or sending and receiving transcriptions. The design may include a contacts/registry service 150. The contacts service of the contacts/registry service 150 may be separate from the registry service, or the contacts service and the registry service may be a single service, such as a Coral service.

The registry service may manage contact information, such as phone numbers, for messaging, calling, and/or transcription sending and receiving. The registry service may map between an identification number for a contact and a phone number assigned to the contact. The registry service may integrate with an external service provider, which may provide the contact information. A contact identification number may be assigned to a particular contact, and/or a contact's profile, and/or a contact's account. The profile and/or account may be associated with multiple devices and/or may correspond to a location, such as, for example, a household associated with the contact.

The contacts service may manage contacts for a given user. The contacts service may integrate with a system that manages information used by a natural language understanding component. The contacts service may store contact data that is manually entered by a user, such as, for example, in the contacts storage 152, and/or the contacts service may integrate with external provides 154 that store contact information. Provisioned phone numbers may be stored, for example, in the provisioned telephone number (TN) storage 156.

The contacts/registry service 150 may communicate with messaging/calling services 158. The messaging/calling services 158 may implement business logic for messaging and/or calling. Again, the messaging services may be a separate component from the calling services, or the messaging services and the calling services may be a single component. Common logic between the messaging services and the calling services may be shared, such as through shared libraries.

The messaging/calling services 158 may include routing/mapping logic 160. The routing/mapping logic 160 may map outgoing and incoming communications. For example, the routing/mapping logic 160 may map between a contact identification number and a provisioned number. The routing/mapping logic 150 may also map between the contact identification number and the phone number assigned to the contact. In instances where a contact identification number is associated with multiple devices, the routing/mapping logic 160 may map between the contact identification number and the multiple devices. In examples, the mapping performed by the messaging/calling services 158 may be based at least in part on information received from one or more external service providers 162, such as by a telecom gateway.

The design may also include an account usage/billing service 164, which may track usage of devices and/or phone numbers. In examples, devices and/or phone numbers may have one or more charges associated with them. For example, a phone number may be associated with a monthly charge, a per-minute charge, and/or a per-message charge. The account usage/billing service 164 may track usage of devices and/or phone numbers and bill a contact based on that usage.

The design may also include a contacts graphic user interface (GUI) 166, which may provide an interface for a user to import and/or manage and/or edit contacts. A messaging GUI 168 may also be provided. The messaging GUI 168 may include an interface and/or application for messaging. A call status/control 170 may also be provided. The call status/control 170 may present who a user is on a call with and may present an icon to allow the user to hang-up or otherwise end the call. Cards 172 may also be provided. Cards 172 may present information, such as in the form of a digital card, for messaging and calling. For example, a card may be presented as a text that was sent as a message or a card that provides the user with the option of rating call quality. A settings/usage GUI 174 may also be provided. The settings/usage GUI 174 may present the user with an interface that may show how phone numbers, accounts, and profiles are assigned, allows the user to manage such phone numbers, accounts, and profiles, and monitor usage and billing.

The messaging/calling services 158 may also access one or more messaging and/or calling speechlets 176. The messaging and/or calling speechlets 176 may allow for implementation of a voice user interface (VUI) for calling. The messaging and/or calling speechlets 176 may be obtained from a device, such as device 178, associated with a user.

FIG. 2 illustrates a flow diagram of an example method 200 for transcribing audio data and providing text data representing the transcription and audio data to one or more user devices. Method 200 is illustrated as a logical flow graph. The order in which the operations or steps are described is not intended to be construed as a limitation, and any number of the described operations may be combined in any order and/or in parallel to implement method 200.

At block 202, the method 200 may include receiving, from a first device associated with a first user, audio data corresponding to user speech. The user speech may include a message directed to a second device associated with a second user. The audio data may be generated by at least one microphone associated with the first device. The audio data may include the user speech and other components, such as, for example, background noise. The audio data corresponding to user speech may be received over a network. The network may represent an array of wired networks, wireless networks (e.g., WiFi), or combinations thereof. The audio data may be received at, for example, a remote system. In some instances, the remote system may be local to an environment associated the first device or the second device. In some instances, some or all of the functionality of the remote system may be performed by one or more of the first device or the second device.

The remote system, the first device, and/or the second device may each include a network interface. These network interfaces may enable communications between the first device, the second device, and the remote system, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

At block 204, the method 200 may include receiving, from the first device, an indication that the message is directed to the second device. The indication that the message is directed to the second device may be a selection by the first user of a name of the second user and/or contact information associated with the second user. The indication may also correspond to the first user speaking or otherwise entering a command to send the audio data and/or start a conversation with the second user. Receiving the indication may be performed over a network and between network interfaces as described herein.

At block 206, the method 200 may performing speech recognition on the audio data to generate text data representing a transcription of the user speech. For example, once the audio data is received from the first device, the portion of the audio data corresponding to the user speech may be separated from other components of the audio data, such as, for example, background noise. ASR techniques may be used to determine words making up the user speech. For example, ASR techniques may include generation of a list that includes the most likely words or phrases spoken by the user, an "N-best list" for example, and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

At block 208, the method 200 may include sending the text data representing the transcription to the first device.

At block 210, the method 200 may include sending the audio data and the text data representing the transcription to the second device. The sending may be based at least in part on the indication that the message is directed to the second device.

At block 212, the method 200 may include causing the first device to display the transcription, or a portion thereof. The transcription may be displayed as typed text, for example. The method 200 may also include causing the first device to display an icon adjacent to the transcription, the icon corresponding to the audio data. The icon, when selected, may cause one or more speakers to output the audio associated with the audio data.

At block 214, the method 200 may include causing the second device to display the transcription, or a portion thereof. The transcription may be displayed as typed text, for example. The method 200 may also include causing the second device to display an icon adjacent to the transcription, the icon corresponding to the audio data. The icon, when selected, may cause one or more speakers to output the audio associated with the audio data. Additionally, or alternatively, the audio associated with the audio data may be output by a device, such as a third device as depicted in FIG. 1*a*, connected, via wired or wireless communication, to the second device. The third device may output the audio upon receipt of the audio data by the second device, by selection of the icon by the second user, by selection of the transcription by the second user, and/or by a command provided by the second user, such as, for example, an audible command.

Figure 3:
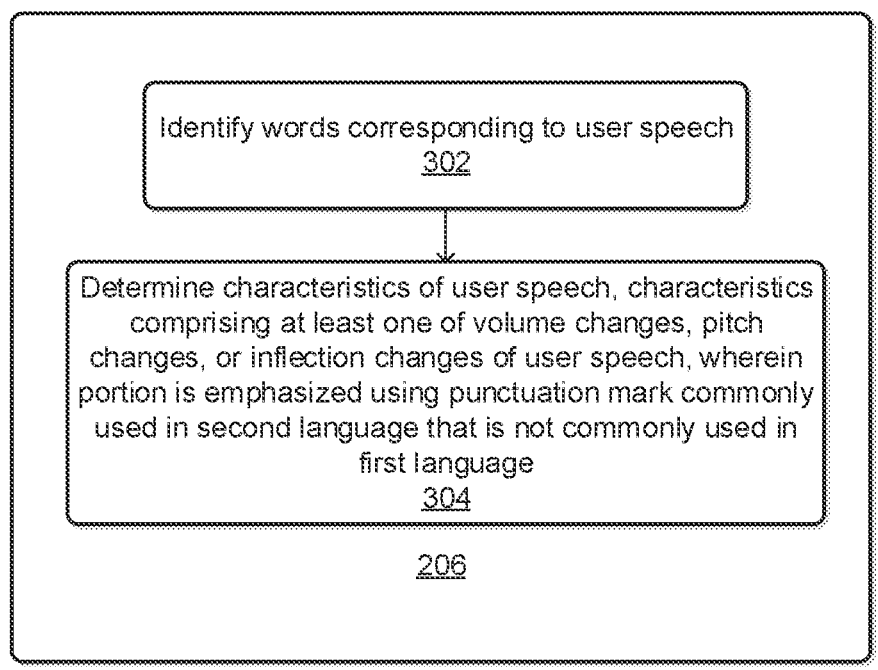
FIG. 3 illustrates a flow diagram of additional operations for transcribing audio data.

FIG. 3 illustrates additional operations of method 200. The additional operations are illustrated as a logical flow graph. The order in which the operations or steps are described is not intended to be construed as a limitation, and any number of the described operations may be combined in any order and/or in parallel.

At block 302, performing speech recognition may include identifying words corresponding to the user speech by, for example, using the ASR techniques described herein.

At block 304, performing speech recognition may include determining at least a portion of a message to emphasize based at least in part on a characteristic of the user speech. The characteristic may include at least one of a change of volume, a change of pitch, and/or a change of inflection. For example, volume changes may be determined based at least in part on signal strength variation corresponding to the volume at which the user is speaking. By way of further example, pitch changes may be determined base at least in part on frequency and/or amplitude changes in the audio data corresponding to changing voice tones by the user. Additionally, or alternatively, inflection changes of the user speech may be determined based at least in part on components of the audio data corresponding to voice attributes of the user, such as, for example, tense, mood, rhythm, accent, cadence, stress, and tone. Other attributes, such as intonation, emphasis, modulation, lilt, and gender may also be determined. The volume changes, pitch changes, and/or infliction changes may be associated with specific words or phrases in the message such that words or phrases emphasized by the user while speaking are represented as emphasized words in the transcription. The techniques may determine at least one of emphasized words or punctuation for the transcription based at least in part on the characteristics. In instances where the emphasized words and/or punctuation are determined, display of the transcription may include the emphasized words and/or punctuation.

Display of the emphasized words may be by, for example, highlighting, underlining, italicizing, bolding, changing of font size, changing of font style, and/or changing of font color. Display of punctuation may follow conventional grammar rules for emphasizing text. For example, in instances where excitement is determined from the characteristics of the audio data, an exclamation point may be inserted into the transcription. Additionally, or alternatively, in instances where the characteristics indicate that the user is asking a question, a question mark may be inserted into the transcription, by way of example. Additional punctuation may be included, such as quotation marks, commas, and periods, for example. The punctuation may include one or more punctuation marks that are commonly used in a second language in instances where the transcription is translated, as described more fully herein. In these instances, the punctuation mark may not be commonly used in a first language, such as the language spoken by a user of the first device. By way of example, when the second language is Spanish, the punctuation mark may include an inverted exclamation point, an inverted question mark, and accented letters. By way of further example, when the second language is Mandarin, the punctuation mark may include Judou marks or rotated punctuation marks used in the English language.

Figure 4:
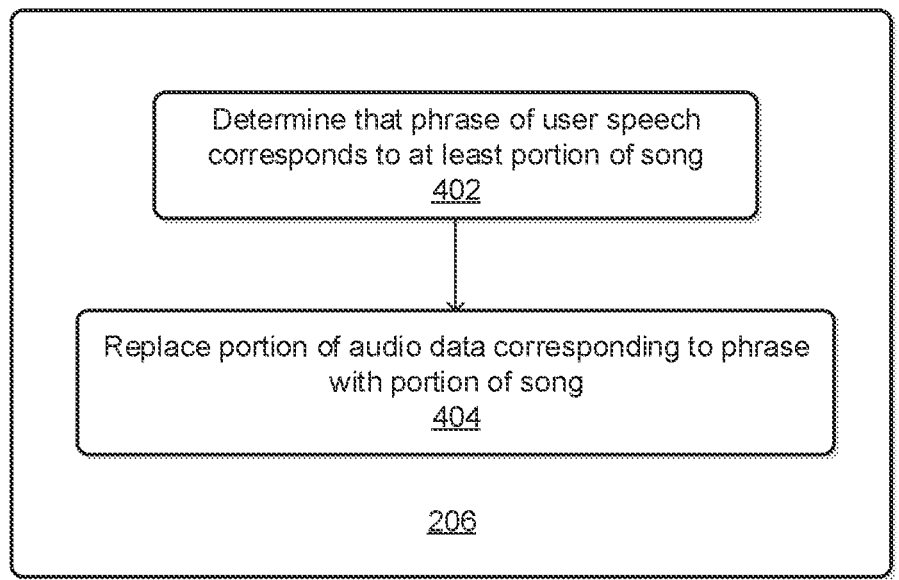
FIG. 4 illustrates a flow diagram of an example process for replacing a portion of audio data with a portion of a song.

FIG. 4 illustrates additional operations of method 200. The additional operations are illustrated as a logical flow graph. The order in which the operations or steps are described is not intended to be construed as a limitation, and any number of the described operations may be combined in any order and/or in parallel.

At block 402, performing speech recognition may include determining that a phrase of the user speech corresponds to at least a portion of a song. Determining that a phrase of the user speech corresponds to at least a portion of a song may be performed by, for example, associating the words, noises, and/or emphasis of the phrase with words, noises, and/or emphasis of one or more songs in, for example, a song database. The songs in the song database may represent reference songs for the phrase of the user speech to be compared to. When the phrase of the user speech is determined to be similar to a portion of the reference songs within a threshold confidence level, the phrase may be determined to correspond to the portion of the song. Additionally, one or more words in the user speech may act as an indicator word, which may increase a probability that a phrase spoken before or after the indicator word corresponds to a portion of a song. For example, a user may say "Do you remember the song that goes like 'here I am, rock you like a hurricane?'" In this example, the word "song" may act as an indicator word that a phrase of the user speech corresponds to a portion of a song. The phrase "here I am, rock you like a hurricane" may be compared to reference songs, which may include the song Rock You Like a Hurricane by the Scorpions. Since the phrase is similar to a portion of the reference song, it may be determined that the phrase corresponds to the portion of the song.

At block 404, performing speech recognition may include replacing a portion of the audio data corresponding to the phrase with second audio data corresponding to the portion of the song. Replacing the portion of the audio data may include determining a start and end point for the phrase in the audio data and removing, attenuating, and/or subtracting that portion of the audio data. The portion of the song may be inserted in place of the phrase such that the audio data includes the portion of the song. Using the example provided above, in the user speech "Do you remember the song that goes like 'here I am, rock you like a hurricane?'", the portion of the audio data corresponding to "here I am, rock you like a hurricane" may be removed from the audio data. The portion of the Scorpions' song, Rock You Like a Hurricane, that corresponds to the removed portion of the audio data may be included in the audio data. The altered audio data may be sent to the first user and/or the second user. When the audio corresponding to the audio data is output, the user speech may be of the first user's voice until the replaced portion. The replaced portion may be audio of the song Rock You Like a Hurricane, for example.

Figure 5:
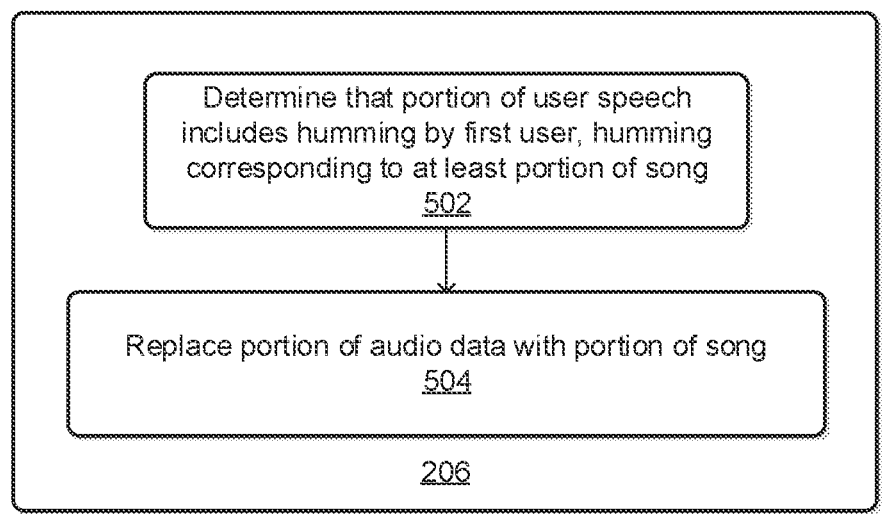
FIG. 5 illustrates a flow diagram of another example process for replacing a portion of audio data with a portion of a song.

FIG. 5 illustrates additional operations of method 200. The additional operations are illustrated as a logical flow graph. The order in which the operations or steps are described is not intended to be construed as a limitation, and any number of the described operations may be combined in any order and/or in parallel.

At block 502, performing speech recognition may include determining that a portion of the user speech includes humming. The humming may correspond to at least a portion of a song. Determining that a portion of the user speech includes humming may be performed by, for example, identifying a portion of the audio data that corresponds to audio from the user but where no words are identified. The humming may be analyzed to determine one or more lyrics, notes, and/or musical rhythms. The lyrics, notes, and/or musical rhythms may be associated with notes and/or musical rhythms of one or more songs in, for example, a song database. The songs in the song database may represent reference songs for the humming to be compared to. When the lyrics, notes, and/or musical rhythms are determined to be similar to a portion of the reference songs within a threshold confidence level, then the humming may be determined to correspond to the portion of the song. Additionally, one or more words in the user speech may act as an indicator word, which may increase a probability that humming corresponds to a portion of a song.

At block 504, performing speech recognition may include replacing a portion of the audio data corresponding to the humming with audio data corresponding to the portion of the song. Replacing the portion of the audio data may include determining a start and end point for the humming in the audio data and removing, attenuating, and/or subtracting that portion of the audio data. The portion of the song may be inserted in place of the humming such that the audio data includes the portion of the song.

Figure 6:
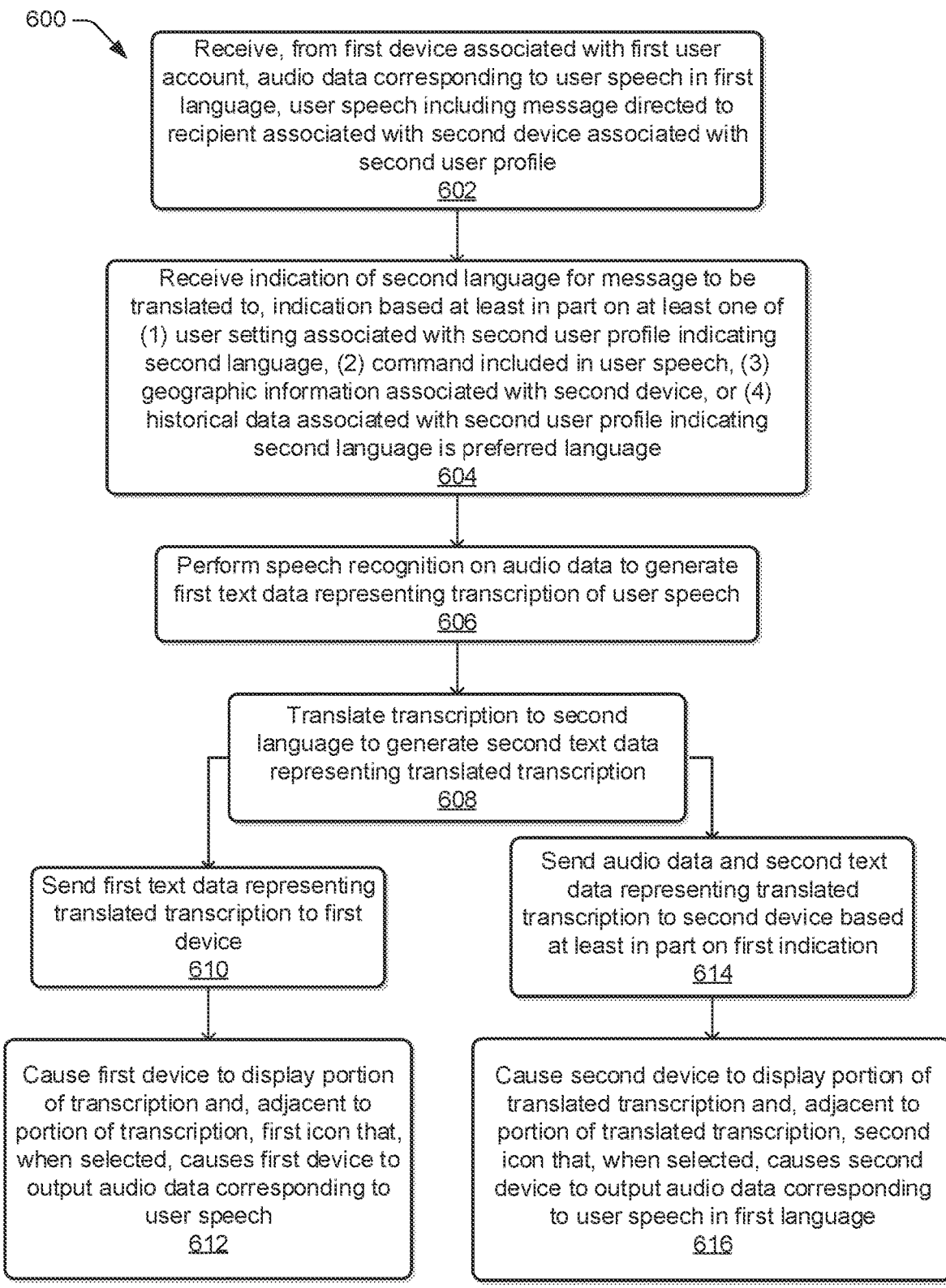
FIG. 6 illustrates a flow diagram of an example process for translating a transcribed audio data.

FIG. 6 illustrates a flow diagram of an example method 600 for transcribing and translating audio data. Method 600 is illustrated as a logical flow graph. The order in which the operations or steps are described is not intended to be construed as a limitation, and any number of the described operations may be combined in any order and/or in parallel to implement method 600.

At block 602, the method 600 may include receiving, from a first device associated with a first user account, audio data corresponding to user speech in a first language. The audio data corresponding to user speech may be received via network interfaces over a network from a remote system, as described herein. In some instances, the remote system may be local to an environment associated the first device or the second device. In some instances, some or all of the functionality of the remote system may be performed by one or more of the first device or the second device. The user speech may include a message directed to a recipient associated with a second device, which may be associated with a second user profile, for example. The audio data may be generated by at least one microphone associated with the first device. The audio data may include the user speech and other components, such as, for example, background noise.

At block 604, the method 600 may include receiving, from the first device, an indication of a second language for the message to be translated to. The indication may be based at least in part on at least one of (1) a user setting associated with the second user profile and/or the second device indicating the second language, (2) a command included in the user speech, such as that given by a first user associated with the first user account, (3) geographic information associated with the second device, or (4) historical data associated with the second user profile and/or the second device indicating the second language as a preferred language. The indication may additionally, or alternatively, be based at least in part on an accent of the second user, historical user data, and/or diction and/or syntax used by the second user.

At block 606, the method 600 may include performing speech recognition on the audio data to generate first text data representing a transcription of the user speech. For example, once the audio data is received from the first device, the portion of the audio data corresponding to the user speech may be separated from other components of the audio data, such as, for example, background noise. ASR techniques as described herein may be used to determine words making up the user speech.

At block 608, the method 600 may include translating the transcription to the second language to generate second text data representing a translated transcription. Translating the transcription may be performed by associating words and phrases, for example, of the transcription with corresponding words and phrases in the second language.

At block 610, the method 600 may include sending the first text data representing the transcription to the first device.

At block 612, the method 600 may include to causing the first device to display the transcription and adjacent to the transcription, a first icon that, when selected, may cause the first device to output the audio data corresponding to the user speech. Sending the transcription may be performed over a network and between network interfaces as described herein. The outputted audio may be in the first language or the second language.

At block 614, the method 600 may include sending the audio data and the second text data representing the translated transcription to the second device based at least in part on the first indication that the message is directed to the second device.

At block 616, the method 600 may include causing the second device to display the translated transcription and, adjacent to the translated transcription, a second icon that, when selected, may cause the second device to output the audio corresponding to the user speech. Outputting the audio data may be in the first language or the second language. Additionally, or alternatively, the audio associated with the audio data may be output by a device, such as a third device as depicted in FIG. 1a, connected, via wired or wireless communication, to the second device. The third device may output the audio upon receipt of the audio data by the second device, by selection of the icon by the second user, by selection of the translated transcription by the second user, and/or by a command provided by the second user, such as, for example, an audible command. The audio may be output in the first language or the second language.

Figure 7:
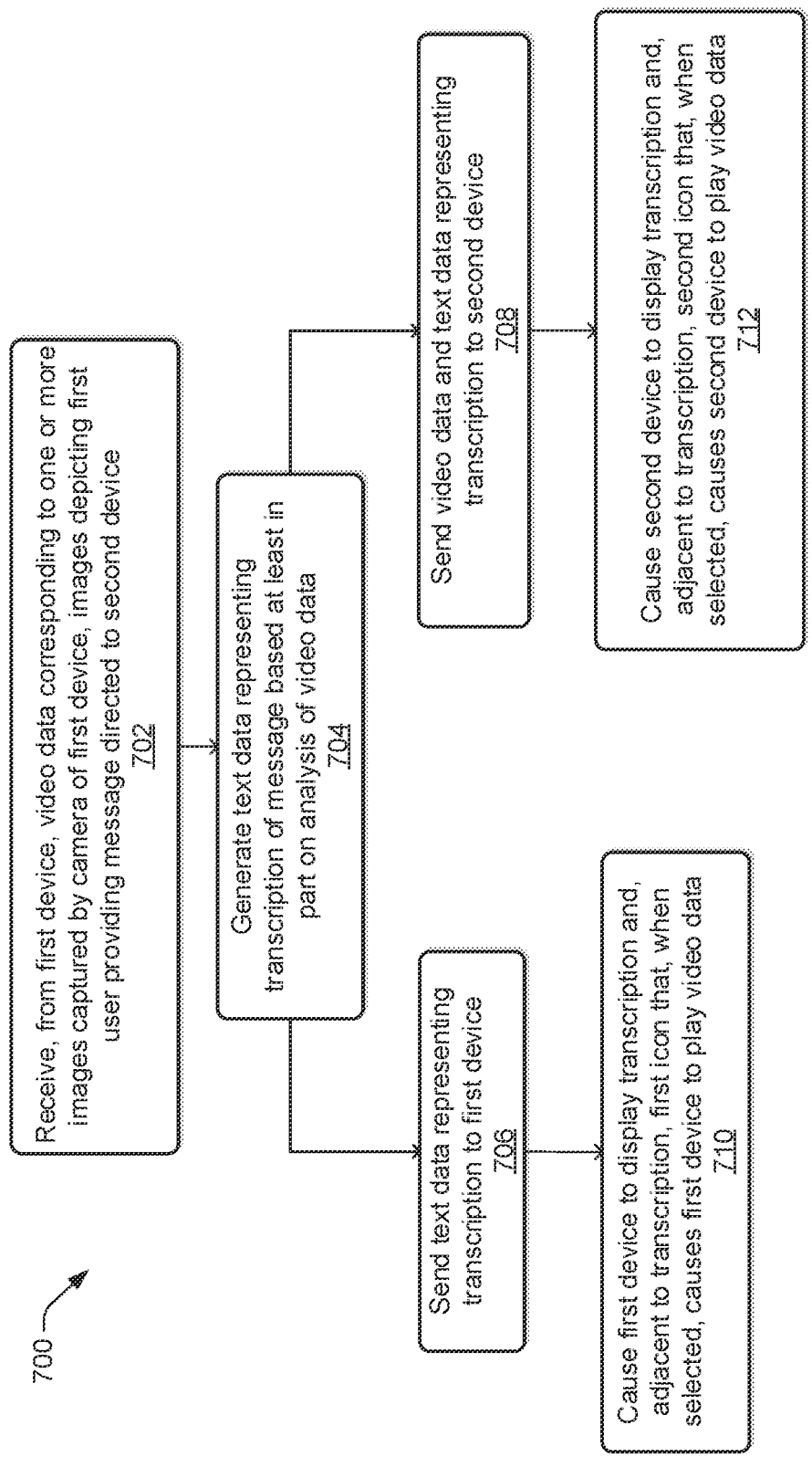
FIG. 7 illustrates a flow diagram of an example process for transcribing a message from video data.

FIG. 7 illustrates a flow diagram of an example method 700 for transcribing a message in video data. Method 700 is illustrated as a logical flow graph. The order in which the operations or steps are described is not intended to be construed as a limitation, and any number of the described operations may be combined in any order and/or in parallel to implement method 700.

At block 702, the method 700 may include receiving, from a first device associated with a first user and/or first user profile, video data corresponding to one or more images captured by a camera of the first device. The images may depict the first user providing a message directed to a second device associated with a second user and/or second user profile. The video data corresponding to user speech may be received by network interfaces over a network from a remote system, as described herein. In some instances, the remote system may be local to an environment associated the first device or the second device. In some instances, some or all of the functionality of the remote system may be performed by one or more of the first device or the second device. The video data may be generated by at least one camera associated with the first device. The video data may include the message and other components, such as, for example, background scenery.

At block 704, the method 700 may include generating text data representing a transcription of the message based at least in part on analysis of the video data. Analysis of the video data may include determining a portion of the images corresponding to the user's mouth. Movement of the mouth in the images may be tracked and compared to reference movements to determine one or more words and/or phrases being spoken by the user. Generating the text data representing the transcription may also include associating audio data with the video data and performing speech recognition on the audio data. ASR techniques as described herein may be used to determine words making up the user speech.

At block 706, the method 700 may include sending the text data representing the transcription to the first device. Sending the text data representing the transcription may be performed over a network and between network interfaces as described herein.

At block 708, the method 700 may include sending the video data and the text data representing the transcription to a second device. Again, sending the video data and the text data representing the transcription may be performed over a network and between network interfaces as described herein.

At block 710, the method 700 may include to causing the first device to display the transcription and, adjacent to the transcription, a first icon that, when selected, may cause the first device to play the video data.

At block 712, the method 700 may include causing the second device to display the transcription and, adjacent to the transcription, a second icon that, when selected, may cause the second device to play the video data. Additionally, or alternatively, the video associated with the video data may be output by a third device connected, via wired or wireless communication, to the second device. The third device may display the video upon receipt of the video data by the second device, by selection of the icon by the second user, by selection of the transcription by the second user, and/or by a command provided by the second user, such as, for example, an audible command.

Figure 8:
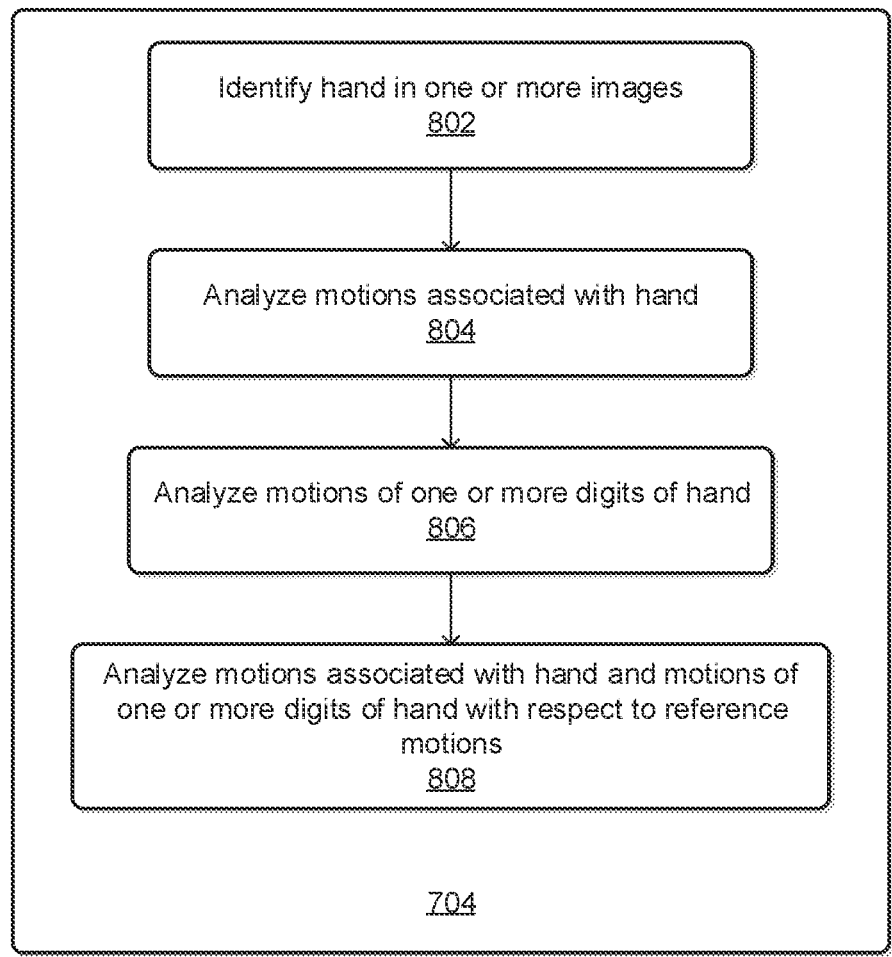
FIG. 8 illustrates a flow diagram of additional operations for transcribing a message from video data including sign language.

FIG. 8 illustrates additional operations of method 700. The additional operations are illustrated as a logical flow graph. The order in which the operations or steps are described is not intended to be construed as a limitation, and any number of the described operations may be combined in any order and/or in parallel.

At block 802, generating text data representing a transcription of the message based at least in part on analysis of the video data may include identifying hand(s) in the one or more images. The hand(s) may be identified by determining a portion of a user depicted in the one or more images that is moving and that has one or more digits, representing fingers.

At block 804, generating text data representing a transcription of the message based at least in part on analysis of the video data may include analyzing motions associated with the hand(s). The motions may correspond to changes in angular orientation of the hand(s), changes in physical coordinates of the hand(s), speed of hand movements, and/or duration of hand movements, for example.

At block 806, generating text data representing a transcription of the message based at least in part on analysis of the video data may include analyzing motions associated with the one or more digits of the hand(s). The motions may correspond to changes in angular orientation of the digit(s), changes in physical coordinates of the digit(s), speed of digit movements, and/or duration of digit movements, for example.

At block 808, generating text data representing a transcription of the message based at least in part on analysis of the video data may include analyzing the motions associated with the hand(s) and the motions of the digit(s) with respect to reference motions to detect at least one of letters, numbers, or words corresponding to sign language. The reference motions may be preconfigured or may be learned from user hand and digital motion over time. The detected letter, numbers, and/or words may be used to compose the transcription.

Figure 9:
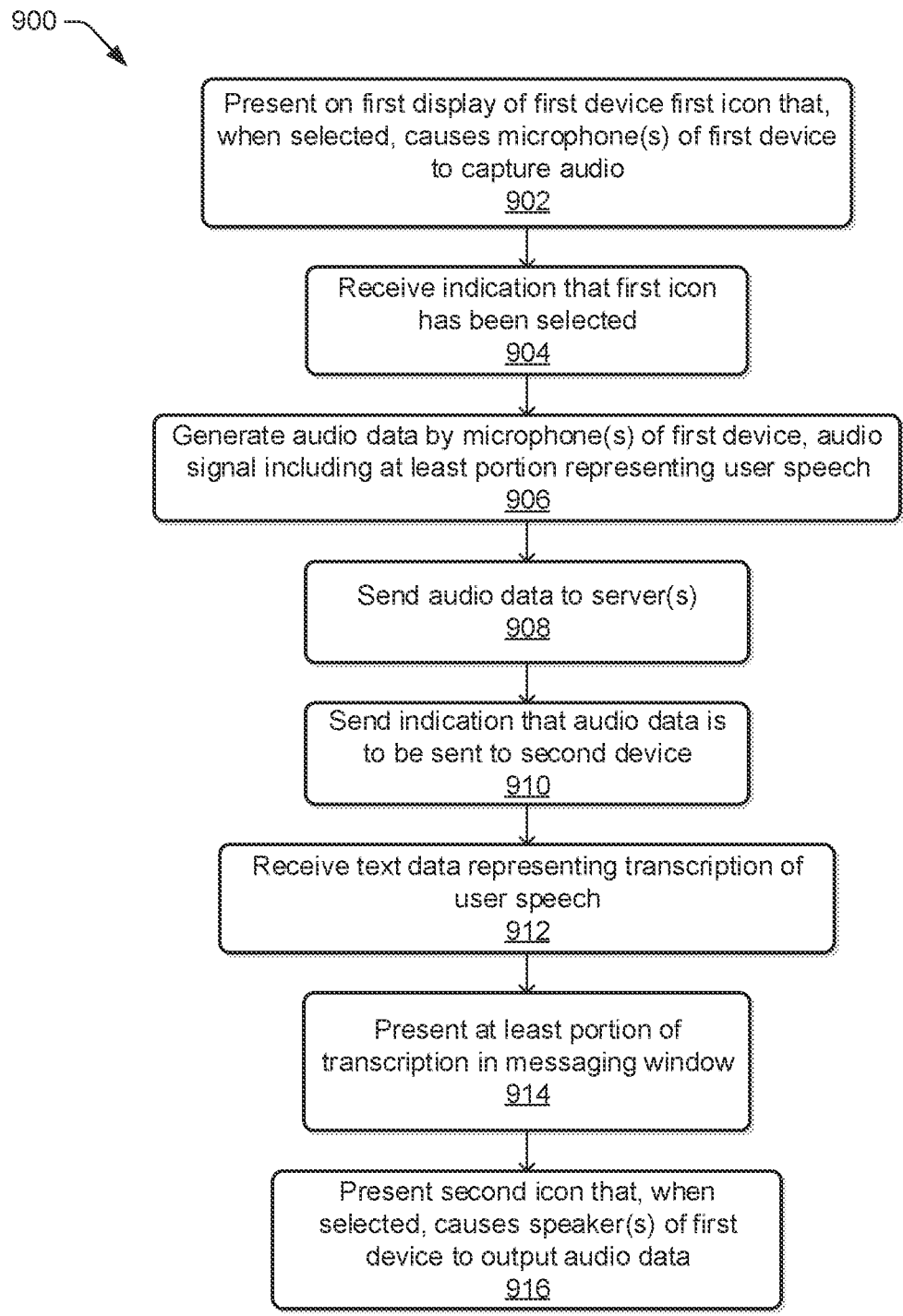
FIG. 9 illustrates a flow diagram of an example process for recording audio and sending corresponding audio data to be transcribed and provided to one or more user devices along with the audio data.

FIG. 9 illustrates a flow diagram of an example method 900 for recording audio and sending corresponding audio data to be transcribed and provided to one or more user devices along with the audio data. Method 900 is illustrated as a logical flow graph. The order in which the operations or steps are described is not intended to be construed as a limitation, and any number of the described operations may be combined in any order and/or in parallel to implement method 900.

At block 902, the method 900 may include presenting, on a first display of a first device, a first icon that, when selected, may cause one or more microphones of the first device to capture audio. The audio may include at least user speech, and may also include other noises such as, for example, background noise. The display may also include a messaging window. The messaging window may depict one or more messages sent from or received by the first device.

At block 904, the method 900 may include receiving an indication that the first icon has been selected. The indication may be the user pressing and releasing the first icon or pressing and holding the first icon. Alternatively, or additionally, the indication may be an audible command to the first device to commence capturing audio.

At block 906, the method 900 may include generating audio data by one or more microphones of the first device. The audio data may include at least a portion representing user speech.

At block 908, the method 900 may include sending the audio data to one or more servers. The audio data may be sent over one or more networks, which may represent an array of wired networks, wireless networks, such as WiFi, or combinations thereof. The one or more servers may be local, such as located within the first device, or the one or more servers may be remote to the first device. When remote, the one or more servers may be part of a remote system. In some instances, some or all of the functionality of the remote system may be performed by the first device.

At block 910, the method 900 may include sending an indication that the audio data is to be sent to a second device. Sending the data may be performed using the networks and network interfaces described herein.

At block 912, the method 900 may include receiving text data representing a transcription of the user speech. Receiving the text data representing the transcription may be performed using the network and servers described herein. The text data representing the transcription may be generated using ASR as described herein. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

At block 914, the method 900 may include presenting the transcription, or a portion thereof, in the messaging window. A name associated with the device and/or user profile and/or user account from which the audio data was generated by may be displayed adjacent to the transcription. A time of day associated with when the transcription was sent and/or received may also be displayed adjacent to the transcription.

At block 916, the method 900 may include presenting a second icon that, when selected, may cause one or more speakers of the first device to output audio corresponding to the audio data. The transcription may be displayed adjacent to the second icon to visually indicate that the second icon and the transcription are associated. Additionally, or alternatively, the second icon, when selected, may cause one or more speakers of a third device to output the audio data.

The remote system, the first device, and/or the second device may each include a network interface. These network interfaces may enable communications between the first device, the second device, and the remote system, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

Figure 10:
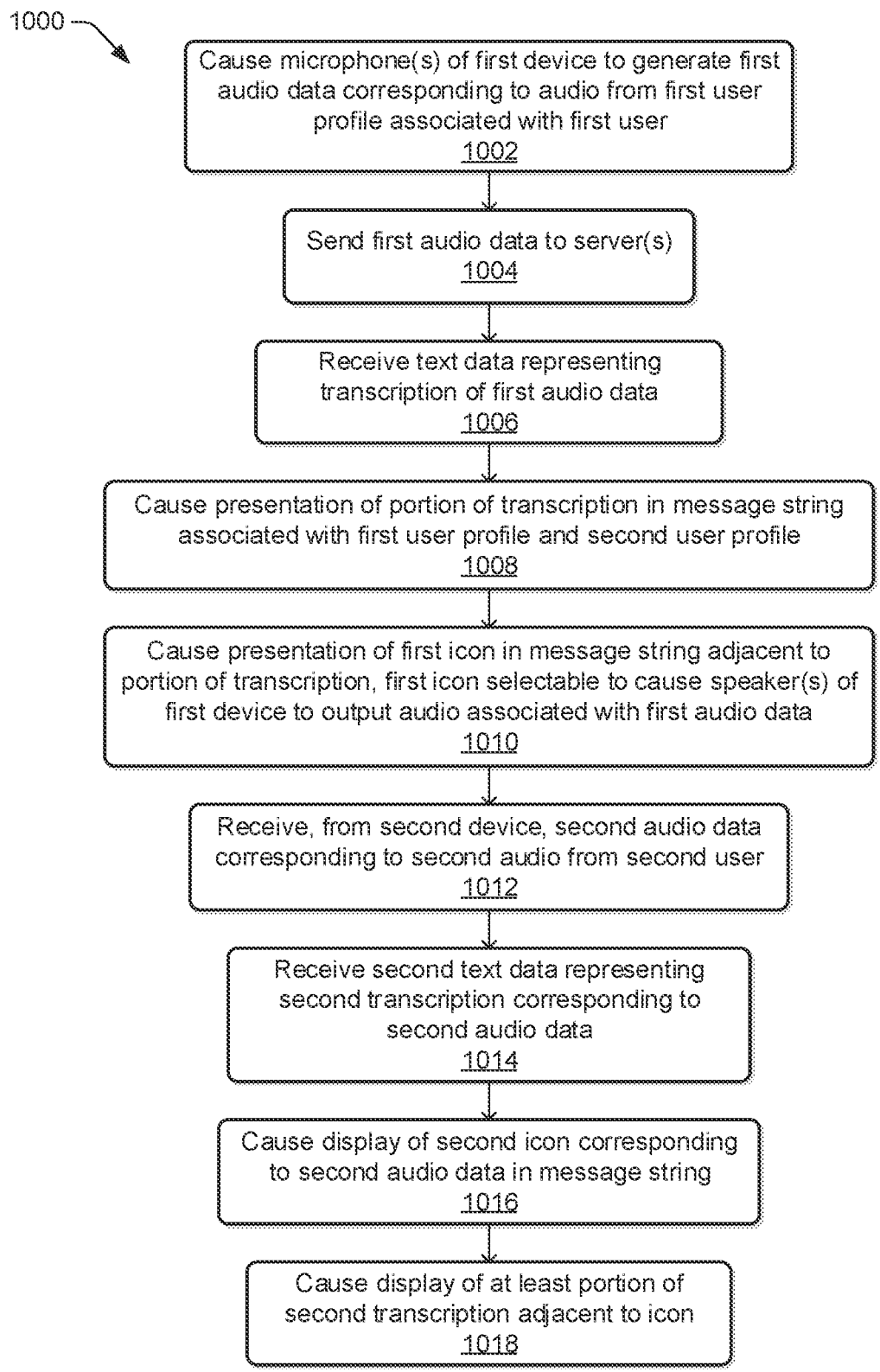
FIG. 10 illustrates a flow diagram of another example process for receiving audio data and a corresponding transcription from one or more processors and causing an icon corresponding to the audio data and the transcription to be displayed in a message string.

FIG. 10 illustrates a flow diagram of an example method 1000 for receiving audio data and a corresponding transcription from one or more processors and causing an icon corresponding to the audio data and the transcription to be displayed in a message string. Method 1000 is illustrated as a logical flow graph. The order in which the operations or steps are described is not intended to be construed as a limitation, and any number of the described operations may be combined in any order and/or in parallel to implement method 1000.

At block 1002, the method 1700 may include causing one or more microphones of a first device to generate audio data corresponding to audio from a first user profile associated with a first user. The audio may include user speech. The user speech may include a message directed to a second user and/or a second user profile and/or a second user account associated with a second device, for example. The audio data may include the user speech and other components, such as, for example, background noise.

At block 1004, the method 1000 may include sending the audio data to one or more servers. Sending the audio data may be performed over one or more networks, which may represent an array or wired networks, wireless networks, such as WiFi, or combinations thereof. The one or more servers may be local, such as located within the first device, or the one or more servers may be remote to the first device. When remote, the one or more servers may be part of a remote system. In some instances, some or all of the functionality of the remote system may be performed by one or more of the first device or the second device.

At block 1006, the method 1000 may include receiving text data representing a transcription of the audio data. The text data representing the transcription may be generated using ASR. ASR techniques may be used to determine words making up the user speech. For example, ASR techniques may include generation of a list that includes the most likely words or phrases spoken by the user, such as an "N-best list," and/or a lattice structure that includes probabilities of different strings of phonemes spoken by the user or the like. The ASR techniques may also include using grammar and/or language models associated with multiple different domains, which may represent a discrete set of messages that users may generally send to each other, such as, for example, introductions, closing or parting words, greetings, and common sayings.

At block 1008, the method 1000 may include causing presentation of the transcription, or a portion thereof, in a message string associated with the first user profile and the second user profile. The second user profile may be associated with a second user account and/or a second device. The transcription may be presented as text. A name associated with the device from which the audio data was generated by may be displayed adjacent to the transcription. A time of day associated with when the text data representing the transcription was sent and/or received may also be displayed adjacent to the transcription.

At block 1010, the method 1000 may include causing presentation of a first icon in the message string adjacent to the portion of the transcription. The first icon may be selectable to cause one or more speakers of the first device to output audio associated with the audio data.

At block 1012, the method 1000 may include receiving, from the second device, second audio data corresponding to second audio from the second user and/or second user profile and/or second user account. Receiving the second audio data may be performing using the networks and servers described herein.

At block 1014, the method 1000 may include receiving second text data representing a second transcription corresponding to the second audio data. Receiving the second text data representing the second transcription may be performed using the networks and servers described herein. Additionally, the second text data representing the second transcription may be generated using the ASR techniques described herein.

At block 1016, the method 1000 may include causing display of a second icon corresponding to the second audio data in the message string. The second icon, when selected, may cause one or more speakers of the first device to output the second audio corresponding to the second audio data.

At block 1018, the method 1000 may include causing display of the second transcription, or a portion thereof, adjacent to the second icon. Audio corresponding to the second audio data may be output by one or more speakers based at least in part on selection of the second icon corresponding to the second audio data. Additionally, or alternatively, the second icon, when selected, may cause one or more speakers of a third device to output the second audio corresponding to the second audio data.

Figure 11:
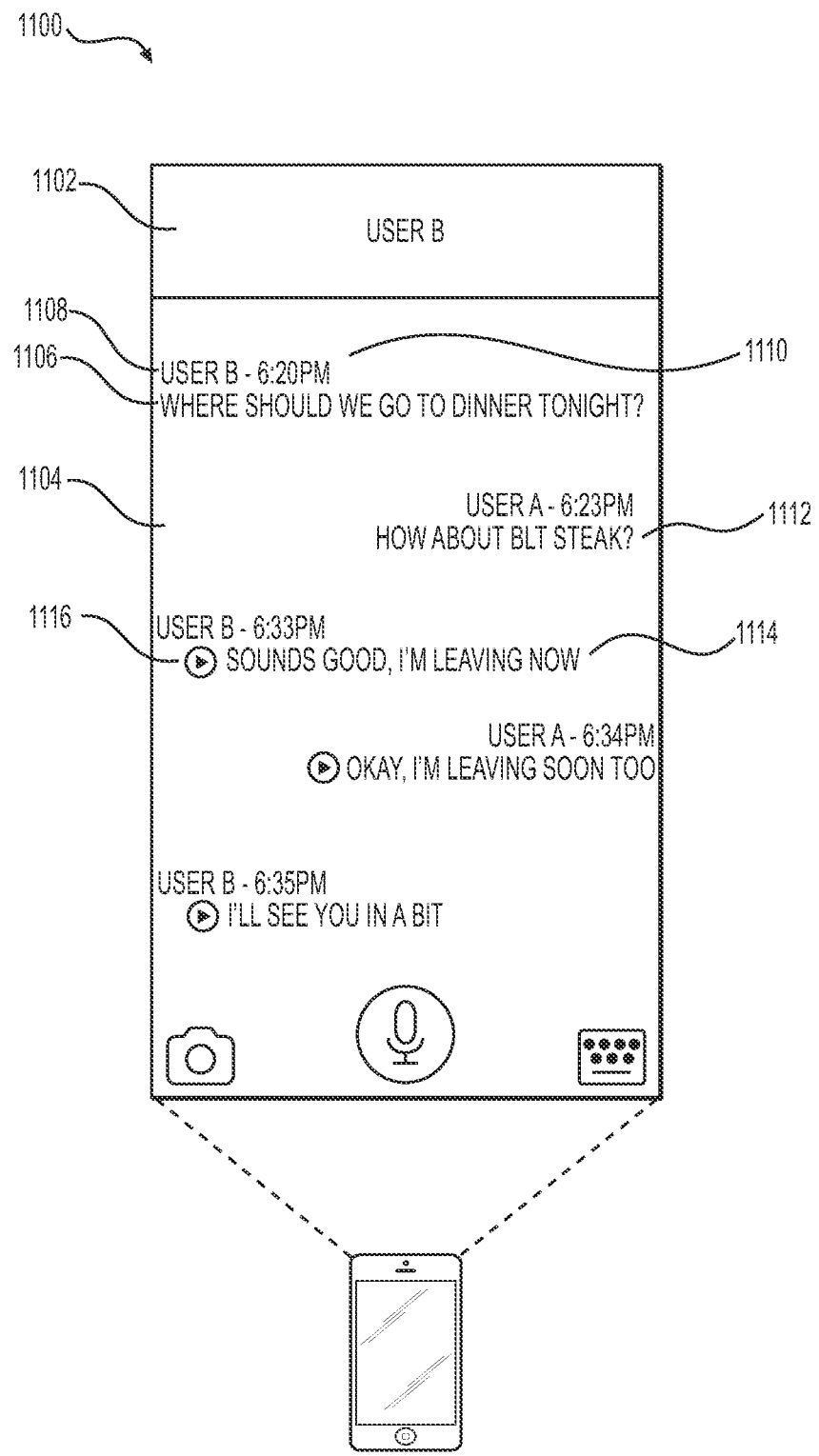
FIG. 11 illustrates an example user interface for sending and receiving audio messages, transcriptions, and text messages.

FIG. 11 illustrates an example user interface 1100 for sending and receiving audio messages, transcriptions, and text messages, among other communication types. The user interface 1100 may be similar to the user interface 136 and/or 140 as shown in FIG. 1a and may include similar functionality. The user interface 1100 may include a header window 1102 that may include the name or other identifying information of a user that will receive and send messages with the user of the device on which the user interface 1100 is displayed. In the example of FIG. 11, the user that will receive and send messages is "User B." As used herein, the user of the depicted user interface will be described as the first user, and the recipient or other user will be described as the second user. However, it should be appreciated that the first user and second user may both send and receive messages as described herein. Additionally, when messages are described as being sent to and/or from a user, it should be appreciated that the messages may be sent to one or more user profiles associated with a user and/or one or more user accounts associated with a user. A user may be associated with more than one account, and each account may be associated with multiple profiles. The user profiles and/or user accounts may be associated with devices of the user, such as, for example, phones, computers, tablets, and/or personal assistants.

The user interface 1100 may also include a messaging window 1104. The messaging window 1104 may include messages sent between the first user and the second user. Additionally, multiple other users may be involved in any given conversation. In these examples, the messaging window 1104 may include messages sent and received from each of the multiple users. The messaging window 1104 may include a text message 1106, for example, sent by the second user as well as a name 1108 associated with the text message 1106. The name 1108 may be a shortened or abbreviated version of the name displayed in the header window 1102. The name 1108 may be displayed in proximity to the text message 1106 such that the first user, when viewing the user interface 1100, may perceive the text message 1106 as being associated with the name 1108. A time of day 1110 that the text message 1106 was received, generated, and/or sent may also be displayed near the text message 1106. For example, the text message 1106 as shown in FIG. 11 reads "Where should we go to dinner tonight?" The name 1108 associated with that text message 11106 is "User B" and the text message 1106 was received at 6:20 pm. The text message 1106, the name 1108, and the time of day 1110 are displayed in close proximity to each other such that the first user may determine that the text message 1106, the name 1108, and the time of day 1110 are associated with each other.

The messaging window 1104 may also include messages sent by the first user to the second user. For example, text message 1112 was sent by the first user (i.e., "User A"). A name associated with the first user and a time of day that the text message 1112 was sent may also be displayed similar to the name 1108 and time 1110 for text message 1106. Messages sent to the device associated with the first user may be displayed differently from messages sent from the device associated with the first user. For example, as shown in FIG. 11, the messages sent to the device (i.e., the messages sent from "User B") may be displayed on one side of the user interface 1100, whereas the messages sent from the device (i.e., the messages sent from "User A") may be displayed on an opposing side of the user interface 1100. Additional differences between sent messages and received messages may also be displayed, such as changes in text font, text size, italics, bolding, underlining, highlighting, and/or coloring.

The messaging window 1104 may also include transcriptions and icons corresponding to audio data. For example, as shown in FIG. 11, a transcription 1114 is displayed next to an icon 1116, which corresponds to audio data receive from, for example, a device associated with "User B." The audio data may correspond to audio received from the second user's device and/or directed to the first user. When the first user selects the icon 1116, one or more speakers of the first device may output audio associated with the audio data. In this example, the one or more speakers may output audio that includes the words "Sounds good, I'm leaving now." The audio may be a copy of the audio received from the second user, and in this example, the voice heard in the audio may be the second user's voice. Alternatively, the audio may be a rendering of the audio received from the second user, and in this example, the voice heard in the audio may be a computerized voice or one or more voices preprogrammed for audio output. The first user may also, or alternatively, select the transcription 1114, and based at least in part on the selection, the one or more speakers of the first device may output audio associated with the transcription. As with selection of the icon 1116, the voice heard in the audio may be the second user's voice, a computerized voice, or one or more voices preprogrammed for audio output. In addition to the icon 1116, a duration of the audio recording associated with the icon 1116 may also be displayed.

The user interface 1100 may also enable the user to select one or more modes for the user interface 110 to operate in. For example, the one or more modes may include a mute mode and/or an audio mode. The mute mode, when selected, may cause messages, when received from other users, to be displayed in the messaging window but may prevent the audio corresponding to the message from being output by the one or more speakers. Additionally, or alternatively, selection of the icon 1116 may be disabled. The audio mode, when selected, may cause messages received from others to automatically be output by the one or more speakers when received at the user's device without selection of the icon 1116. The mute mode and/or the audio mode may be set as a default mode by the user.

The various text messages, icons, and transcriptions may be displayed in the messaging window 1104 in chronological order such that the messages sent and/or received first in time appear at or near the top (i.e., near the header window 1102) of the messaging window 1104, while messages sent and/or received at later times appear in chronological order under those messages sent and/or received first in time. As additional messages are sent and/or received, they may be displayed in chronological order at or near the bottom of the messaging window 1104. Alternatively, the messages sent and/or received first in time may appear at or near the bottom of the messaging window 1104, while messages sent and/or received at later times may appear in chronological order above those messages sent and/or received first in time. When the messages fill or substantially fill the messaging window 1104, older messages may be pushed out of view in the messaging window 1104. The first user may view the older messages that have been pushed out of view by scrolling in the messaging window 1104. The scrolling may be by touch input, such as when the first device includes a touchscreen, clicking on a scroll bar, scrolling by a mouse or other pointing device, and/or by providing a scrolling command to the first device such as an audible command.

The user may also be presented with the option to supplement his or her text messages and/or transcriptions, such as, for example, with emojis. One or more words of the message may be determined to correspond to one or more emojis. A suggestion may be sent to the user device to include the one or more emojis in the message. The one or more emojis may replace the one or more corresponding words, or the emojis may be displayed in addition to the corresponding words.

Figure 12:
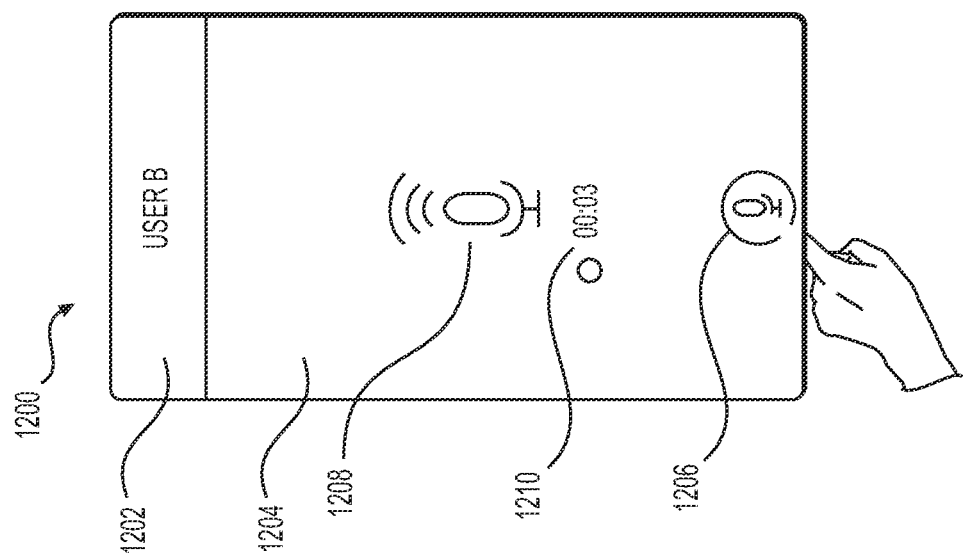
FIG. 12 illustrates an example user interface for recording audio messages.

FIG. 12 illustrates an example user interface 1200 for recording audio messages. The user interface 1200 may include some or all the features of the user interface 1100. For example, the user interface 1200 may include a header window 1202 and a messaging window 1204. The user interface 1200 may also include a recording icon 1206 that, when selected by the user, may initiate capturing of audio by one or more microphones of the first device. Selection of the recording icon 1206 may cause the one or more microphones to generate audio data corresponding to the captured audio. As shown in FIG. 12, selection of the recording icon 1206 may be initiated by a user pressing on the portion of the screen displaying the recording icon 1206.

Recording of audio may commence when the user presses the portion of the screen associated with the recording icon 1206, and recording may continue for as long as the user maintains contact with the portion of the screen associated with the recording icon 1206, such as by pressing and holding the portion of the screen associated with the recording icon 1206. Alternatively, recording of audio may commence when the user presses and releases the portion of the screen associated with the recording icon 1206, and recording may continue until the user presses and releases the portion of the screen associated with the recording icon 1206 a second time. Alternatively, or additionally, recording of audio may commence when the user provides a command, such as an audible command, to the device to commence recording, and recording may continue until the user provides a command to stop recording. Textual or audio clues may be provided to the user to instruct the user on how to record audio. For example, in the instance where recording of audio commences when the user presses and holds the portion of the screen associated with the recording icon 1206, a textual clue such as "Press and hold to record voice message" may be displayed. The textual clue may be provided when the user engages with the user interface 1200 in a way that shows an intent to record a message, such as, for example, if the user presses but releases the portion of the screen associated with the recording icon 1206.

An indicator 1208 may be displayed while the one or more microphones are capturing the audio. The indicator 1208 may provide the user with a visual indication that the one or more microphones are capturing audio, signifying to the user that he or she may begin speaking and/or continue speaking. The indicator 1208 may be a static image or may be animated. When animated, the indicator 1208 may provide the user with an indication of a strength of the audio data being generated by the one or more microphones. For example, as shown in FIG. 12, the indicator 1208 includes three arched lines above an illustration of a microphone. The arched lines may light up or otherwise change in appearance as the signal strength changes. For example, only the bottom arched line may be lit up when the signal strength is weak, and as the signal strength increases, the middle and upper arched lines may also light up. A timer 1210 may also be displayed to provide a visual indication of the duration of the recording.

Figure 13:
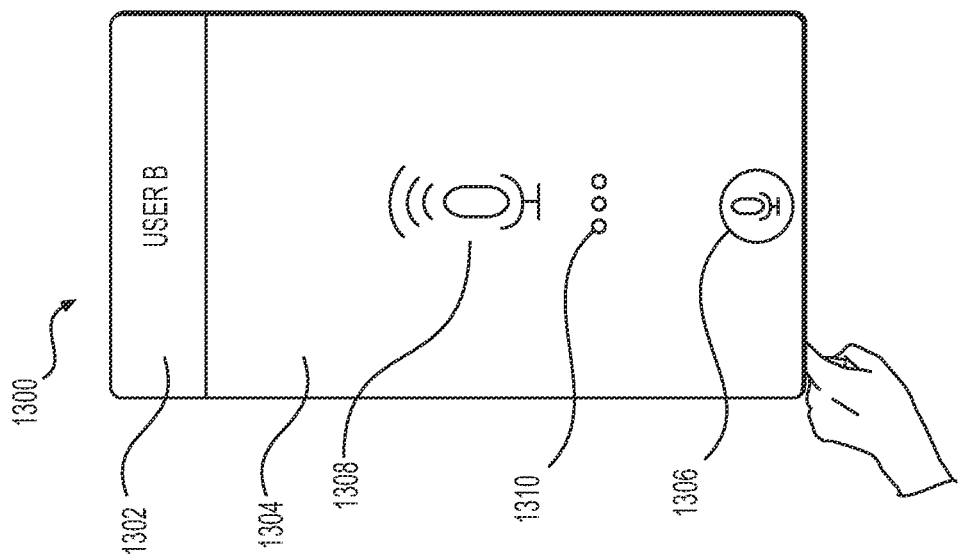
FIG. 13 illustrates an example user interface depicting loading and/or buffering of audio messages.

FIG. 13 illustrates an example user interface 1300 depicting loading and/or buffering of audio messages. The user interface 1300 may include some or all the features of the user interface 1100. For example, the user interface 1300 may include a header window 1302, a messaging window 1304, a recording icon 1306, and an indicator 1308. A buffering icon 1310 may also be displayed to provide a visual indication that audio has been captured and audio data corresponding to the audio is buffering and/or loading. The buffering icon 1310 may be displayed when the user stops providing audio to the one or more speakers, and/or when the user releases the portion of the screen associated with the recording icon 1306, and/or when the user presses the portion of the screen associated with the recording icon 1306 for a second time, and/or when the user provides an audible command to stop recording. In the example depicted in FIG. 13, the user has moved his or her finger off of and/or away from the recording icon 1306 to stop recording of audio.

As shown in FIG. 13, the buffering icon 1310 is depicted as an ellipsis. However, the buffering icon 1310 may also be depicted as a loading icon, such as a loading bar or loading circle. The loading bar or loading circle may provide the user with an indication of the progress of the buffering and/or loading by, for example, depicting an empty loading bar, such as an unfilled rectangle, or empty loading circle, such as an unfilled circle, and filling or otherwise changing the color or appearance of the loading bar or loading circle as buffering or loading progresses. Additionally, or alternatively, the buffering icon 1310 may include a percentage display that may start at 0% and may increase to 100% as the buffering or loading progresses. When buffering or loading is complete, the user interface 1300 may stop display of the indicator 1308 and the buffering icon 1310, and may display components similar to those shown in FIG. 11. Additionally, an icon corresponding to the generated audio data may be displayed along with a transcription corresponding to the audio data.

Figure 14:
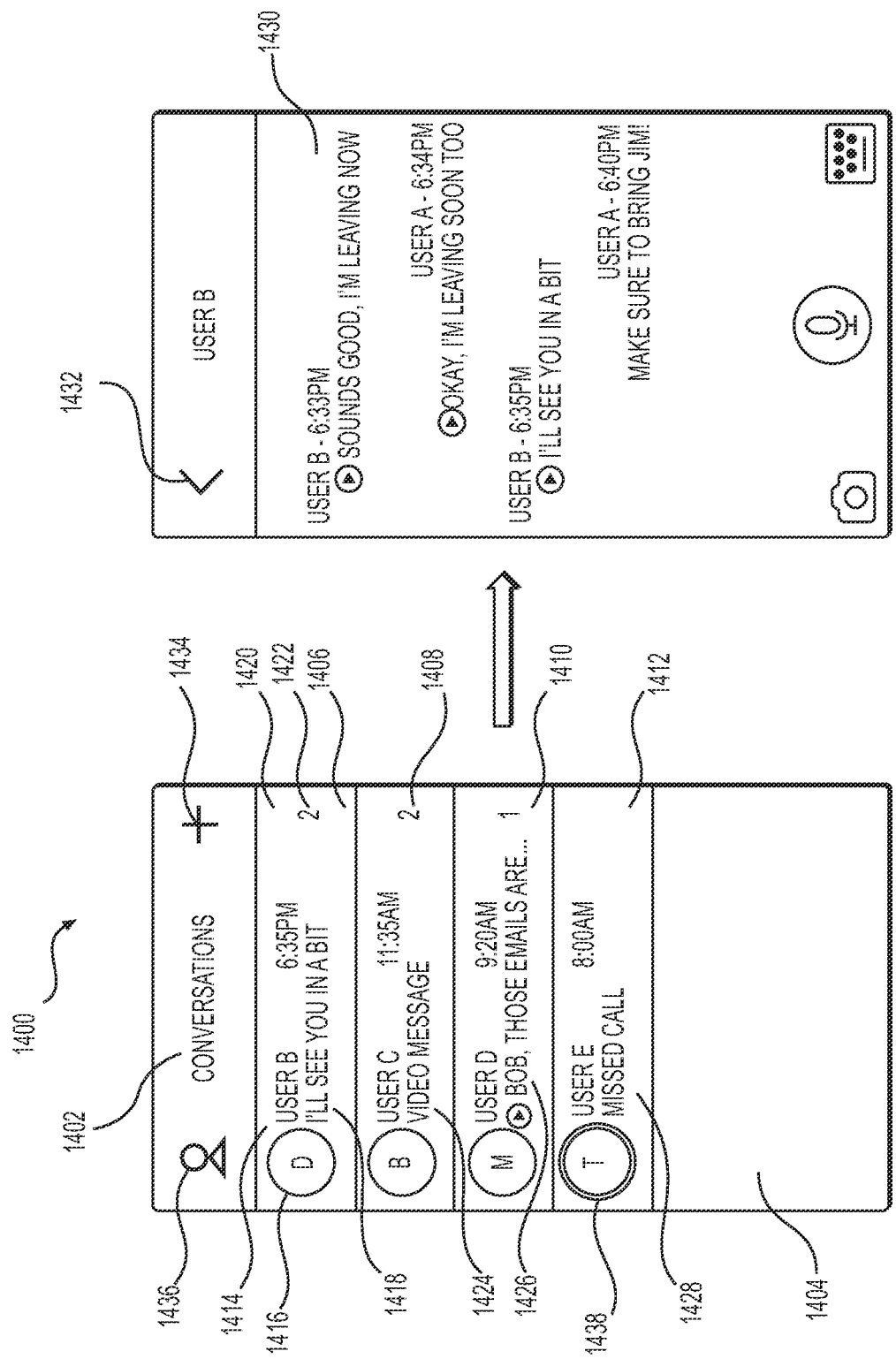
FIG. 14 illustrates an example user interface depicting a conversations window and selection of the same.

FIG. 14 illustrates an example user interface 1400 depicting a conversations window and selection of the same. The user interface 1400 may include some or all the features of the user interface 1100. For example, the user interface 1400 may include a header window 1402. The user interface 1400 may also include a conversations window 1404. The conversations window 1404 may include an indication of one or more conversations that the first user has had or is having with one or more other users. As illustrated in FIG. 14, for example, the conversations window 1404 contains four conversations: (1) a first conversation 1406 with "User B"; (2) a second conversation 1408 with "User C"; (3) a third conversation 1410 with "User D"; and (4) a fourth conversation 1412 with "User E." The order of the conversations in the conversations window 1404 may be alphabetical or, as depicted in FIG. 14, chronological. For example, the latest message in time for each conversation may be used as a timing indication, and the conversations may be arranged based on the timing indication for each conversation.

Each conversation in the conversations window 1404 may include a name 1414, a symbol 1416, a message indicator 1418, a time 1420, and/or a message counter 1422. The name 1414 may corresponding to a second user with whom the first user is having a conversation with. The name 1414 may also include additional identifying information about the second user, such as, for example, whether the conversation is with a device classified as a home device or a work device, and/or whether the conversation is with multiple devices located in the same environment or associated with a group of users. For example, the additional identifying information may be that the conversation is with a group of users. The symbol 1416 may correspond to an initial or other indicator for the second user. As shown in FIG. 14, the symbol 1416 is the letter "D." The symbol 1416 may additionally, or alternatively, include one or more of an avatar, a photograph, or an animation associated with the name 1414.

The message indicator 1418 may provide a visual indication of the type of message and/or the type of conversation. For example, as shown in FIG. 14, the message indicator 1418 associated with the first conversation 1406 is text that states "I'll see you in a bit." This text may be associated with a conversation where at least the latest message in the message string is a text message that includes at least the text "I'll see you in a bit." The latest message in the message string may also be a message typed by the user but not yet sent to the recipient. In another example, the message indicator 1424 associated with the second conversation 1408 states "Video Message," which may indicate that at least the latest message in the second conversation 1408 is a video message. In another example, the message indicator 1426 associated with the third conversation 1410 shows a play icon and text that states "Bob, those emails are . . . ." This message indicator 1426 may indicate that the latest message in the third conversation 1410 is an audio recording that has a corresponding transcription. In yet another example, the message indicator 1428 associated with the fourth conversation 1412 states "Missed Call," which may indicate that the fourth conversation 1412 is a telephone call and/or that the latest event in the fourth conversation 1412 was a missed call.

The message counter 1422 may provide a visual indication of the number of unread messages in a conversation. For example, the message counter 1422 associated with the first conversation 1406 displays the number "2," which indicates that there are two unread messages from "User B." The order in which the conversations are displayed may depend on the number of unread messages in each conversation. For example, the conversation with the most unread messages may be displayed at or near the top of the conversations window 804, while other conversations with fewer unread messages may be displayed in descending order under the conversation with the most unread messages.

The user interface 1400 may receive a selection of a conversation from the conversations in the conversations window 1404. Selection of a conversation may cause display of a messaging window 1430, which may be similar to the messaging window 1404, described more fully above with respect to the user interface 1100. Additionally, the substance of the header window 1402 may change upon selection of a conversation. For example, the header window 1402 may change from displaying "Conversations" to displaying a name (e.g., the name 1414) associated with the chosen conversation. The header window 1402 may also include a navigation icon 1432 that, when selected by the user, may cause the conversations window 1404 to be displayed.

The user interface 1400 may also include a new message icon 1434. Upon selection of the new message icon 1434, the device may display one or more contacts that the user may select to start a conversation with. The user may navigate through a list of the one or more contacts such as by scrolling and/or by typing the name, or a portion thereof, of a requested contact into a searching window. The one or more contacts, and their corresponding contact information, may have been added by the user, or, the one or more contacts may have been imported from and/or accessed through another application. For example, the user interface 1400 may include an access icon 1436 that, when selected by the user, may cause the device to access a contacts database stored locally or remotely. For example, the contacts database may be a database associated with a telephone calling application stored on and accessed by the device. The user may select one or more of the contacts from the contacts database to import into a contacts list associated with the user interface 1400. Information related to user profile(s) and/or user account(s) associated with contacts in the contacts list may also be imported.

The user interface 1400 may also include a Drop-In indicator 1438. The Drop-In indicator 1438 may indicate that a "Drop-In" feature has been enabled for one or more contacts. The Drop-In feature may allow the enabled contact to interrupt other conversations. For example, when a contact with the Drop-In feature enabled sends a message to the user, the device may cause a messaging window, such as messaging window 1430, that includes the message to be displayed instead of the conversations window 1404 or any other messaging window that the user was previously engaged in.

Figure 15:
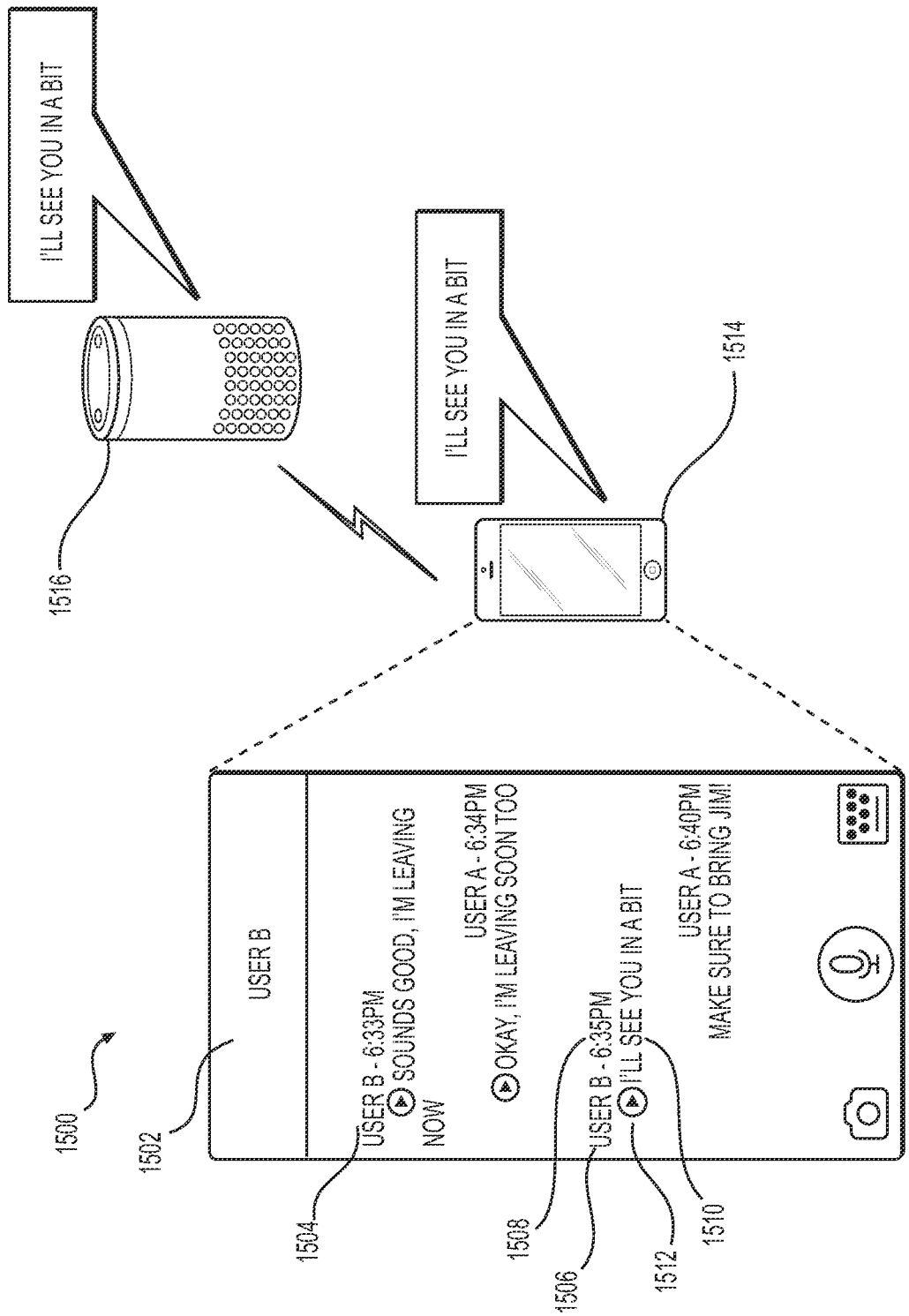
FIG. 15 illustrates an example user interface where a transcription is selected and audio corresponding to the transcription is output by a device.

FIG. 15 illustrates an example user interface 1500 depicting selection of a transcription for audio output by the first device. The user interface 1500 may include some or all the features of the user interface 1100. For example, the user interface 1500 may include a header window 1502, a messaging window 1504, a name 1506 of the second user, and a time of day 1508 associated in a message sent by the second user. The user interface 1500 may also include a transcription 1510 presented near an icon 1512, which corresponds to audio data receive from, for example, a device associated with the second user. The transcription 1510 and/or the icon 1512 may be selectable by the first user to cause audio associated with the audio data to be output. The audio may be output by one or more speakers of the first device 1514 and/or the audio may be output by a third device 1516. As shown, for example, in FIG. 15, the first user may select the icon 1512. When the icon is selected, it may be displayed differently to visually indicate that the icon 1512 has been selected. For example, all or a portion of the icon 1512 may change color and/or appear bolded when the icon 1512 is selected. Additionally, alternatively, the transcription 1510 may be displayed different to visually indicate that the audio corresponding to the audio data is being output. For example, all or a portion of the transcription 1510 may change color, change font style, change font size, be highlighted, be underlined, be italicized, and/or be bolded.

Figure 16:
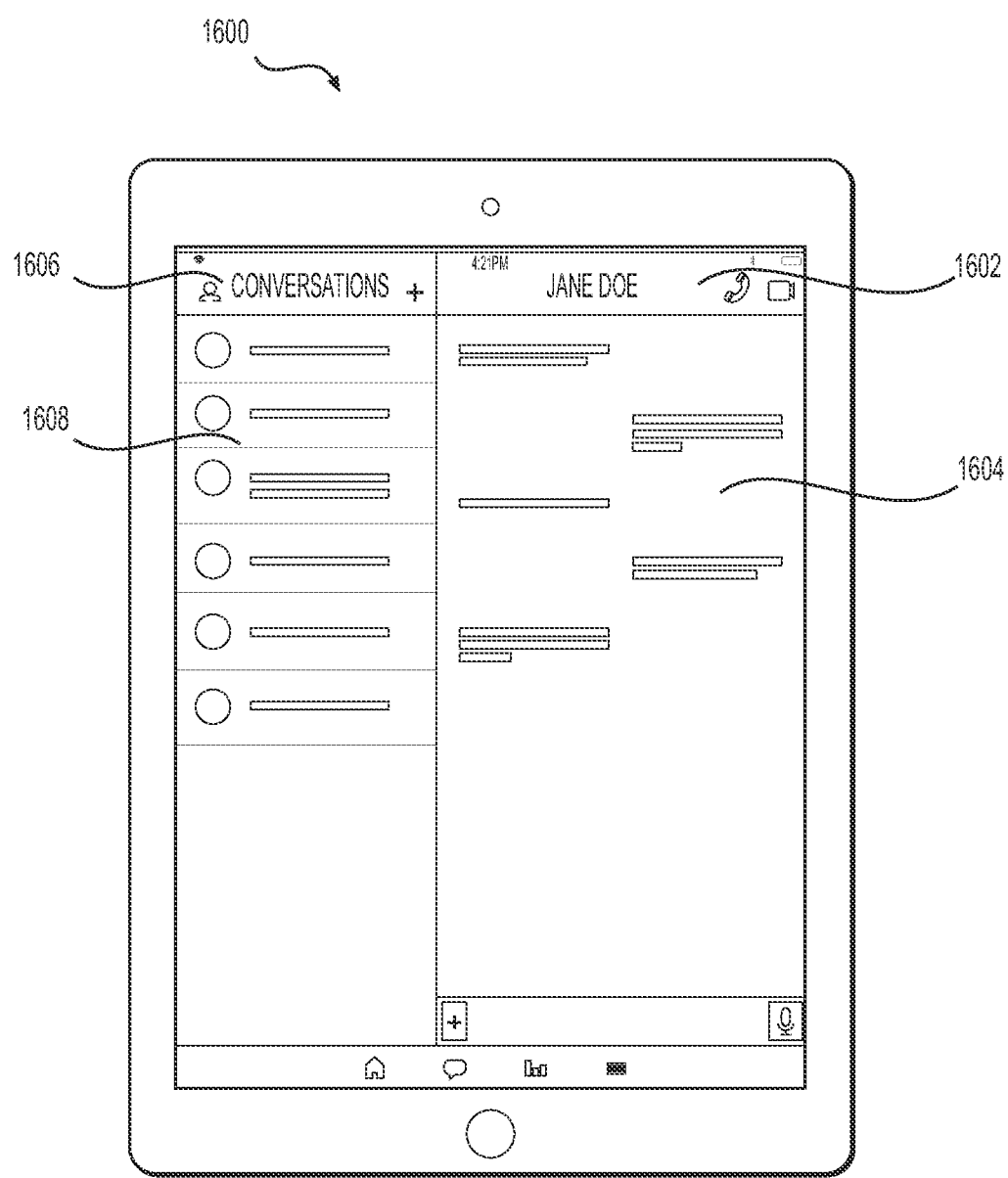
FIG. 16 illustrates an example user interface on a tablet device.

FIG. 16 illustrates an example user interface 1600 on a tablet device. The user interface 1600 may include the same or similar features as those in user interface 1100 and user interface 1400. For example, as in user interface 1100, a first header window 1602 and a messaging window 1604 may be displayed. Additionally, the user interface 1600 may include a second header window 1606 and a conversations window 1608, as in user interface 1400. Given the additional surface area of a tablet device, the first header window 1602, the messaging window 1604, the second header window 1606, and the conversations window 1608 may be displayed at the same time. Alternatively, upon selection by the user, the first header window 1602 and the messaging window 1604 may be presented on the entire or substantially the entire touchscreen of the tablet.

Figure 17:
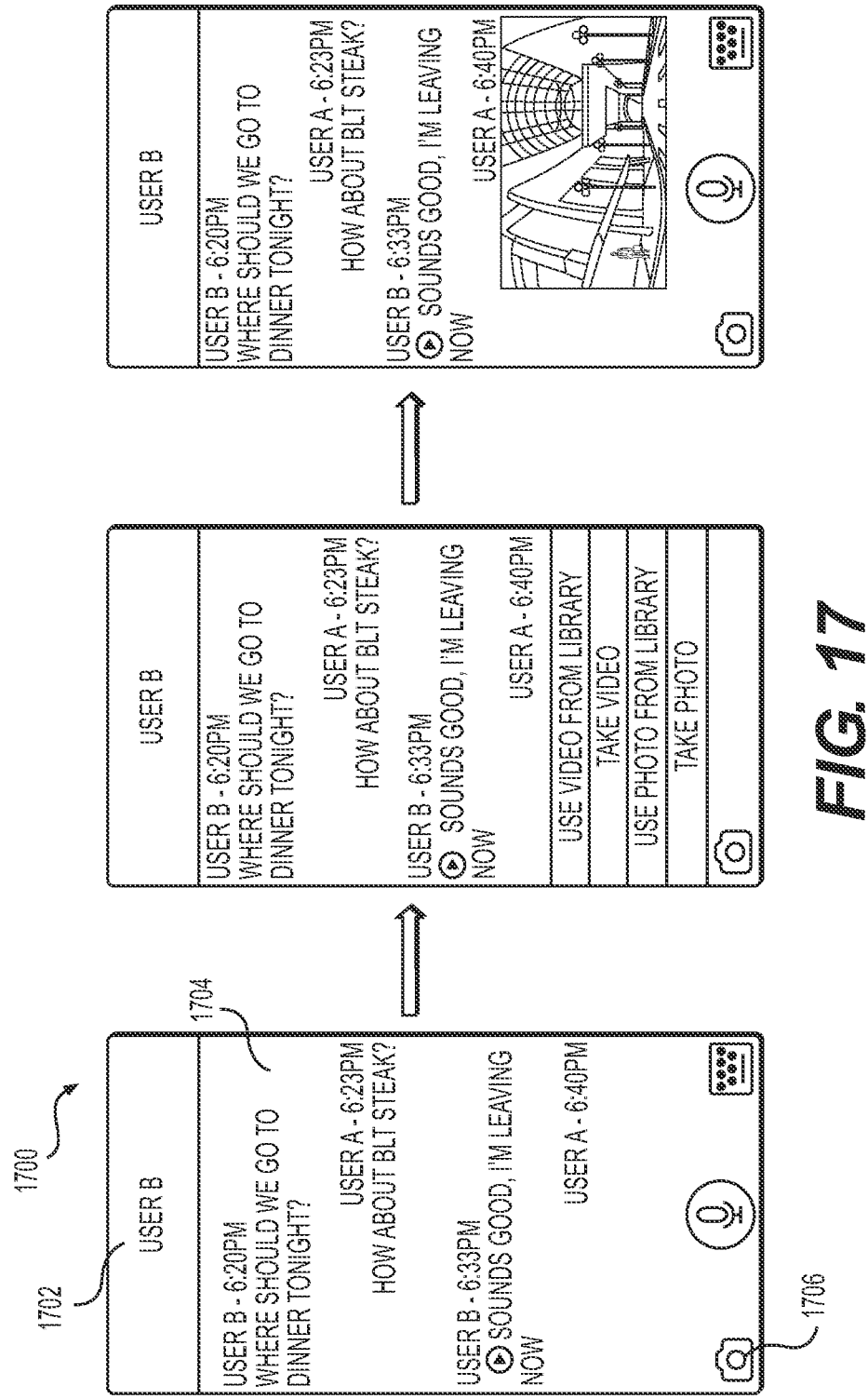
FIG. 17 illustrates an example user interface depicting photo and/or video inclusion in a messaging window.

FIG. 17 illustrates an example user interface 1700 depicting photo and/or video inclusion in a messaging window. The user interface 1700 may include some or all the features of the user interface 1100. The images of the user interface 1700 as depicted in FIG. 17 represent a progression, from left to right, of changes to the user interface 1700 as the user interacts with the user interface 1700. For example, the user interface 1700 may include a header window 1702 and a messaging window 1704. The user interface 1700 may also include a photo icon 1706. The photo icon 1706, when selected by the user, may display one or more options for inclusion of a photo or a video into the messaging window 1704. As shown in FIG. 17, selection of the photo icon 1706 may cause display of four, for example, options including (1) "Use Video from Library," (2) "Take Video," (3) "Use Photo from Library," and (4) "Take Photo."

The Use Video from Library option may allow the user to access one or more video libraries stored on the device and/or a remote storage device. The user may select one or more videos from the library, and the selected video(s) may be included, for example loaded, into the messaging window 1704. The Take Video option may allow the user to access video recording functionality of the device. The user may record video, and upon conclusion of the recording, the video may be included, for example loaded, into the messaging window 1704. The Use Photo from Library option may allow the user to access one or more photo libraries stored on the device and/or a remote storage device. The user may select one or more photos from the library, and the selected photo(s) may be included, for example loaded, into the messaging window 1704. The Take Photo option may allow the user to access camera functionality of the device. The user may capture one or more photos with a camera of the device and include, for example load, the photo(s) into the messaging window 1704. As shown in FIG. 17, the user has selected the photo icon 1706, causing the four options described above to be displayed. The user then selects the Use Photo from Library option and chooses a photo from a photo library stored, for example, on the device. The photo is then included in the messaging window 1704.

Figure 18:
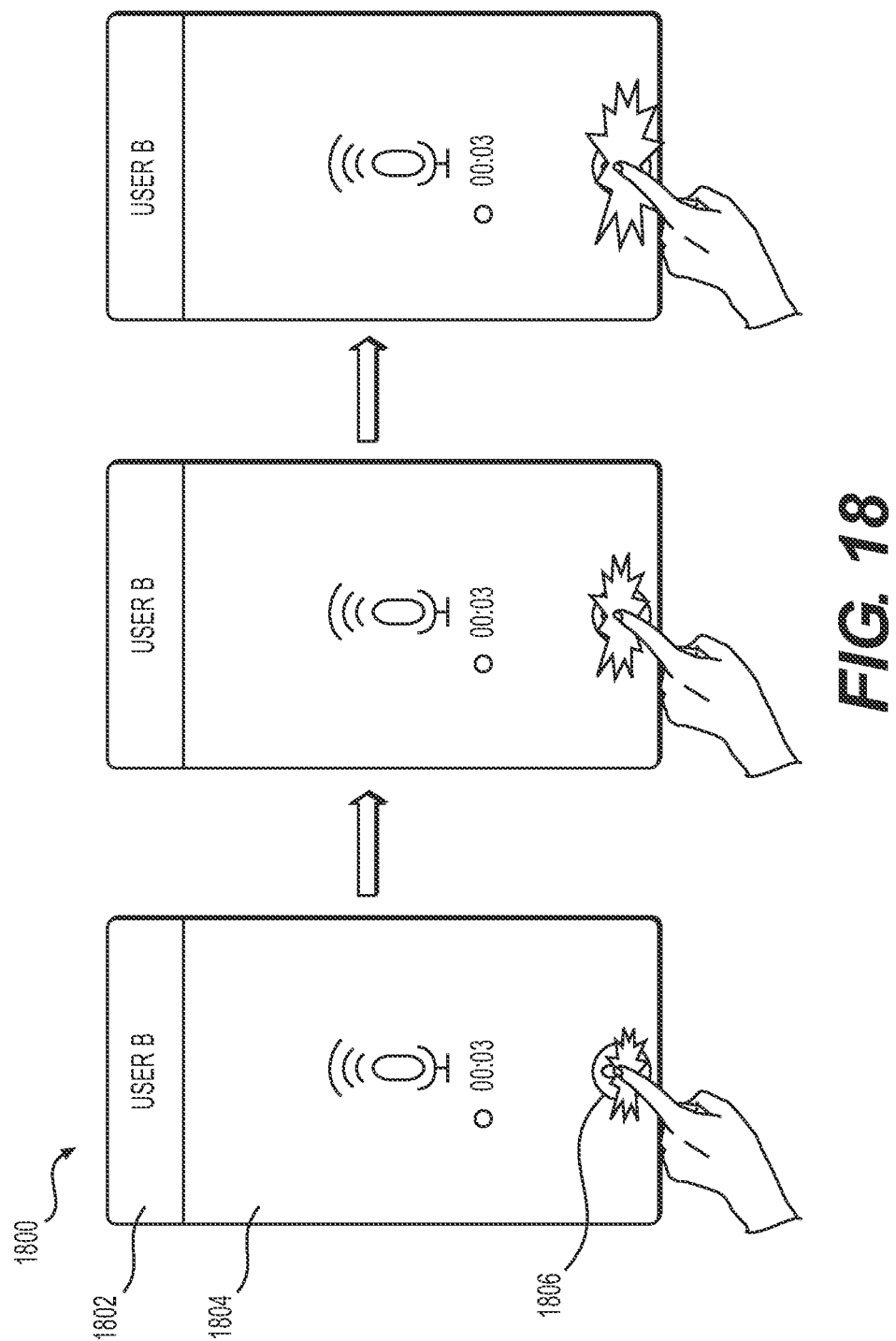
FIG. 18 illustrates an example user interface depicting selection of an icon at various pressures.

FIG. 18 illustrates an example user interface 1800 depicting selection of an icon at various pressures. The user interface 1800 may include some or all the features of the user interface 1100. For example, the user interface 1800 may include a header window 1802, a messaging window 1804, and a recording icon 1806. The user interface 1800 may provide functionality for determining a pressure that the user is pressing on the recording icon 1806. For example, the device may include a touchscreen, at least a portion of which may include one or more force sensors. The force sensors may measure the force at which the touchscreen is pressed. As the user selects the recording icon 1806 by pressing on the recording icon 1806, the force sensors may detect pressure applied by the user. The pressure may be measured during the duration of the user's selection of the recording icon 1806. FIG. 18 depicts various amounts of force applied to the recording icon 1806. The pressure measurements may be associated with one or more words or phrases spoken by the user while pressing the recording icon 1806. The pressure measurements may be used to determine characteristics of the user's message. For example, a small pressure measurement may indicate that words spoken by the user are not to be emphasized and/or should be deemphasized. To the contrary, a large pressure measurement may indicate that words spoken by the user are to be emphasized or that punctuation corresponding to an excited message should be included, for example. The pressure measurements may be utilized in addition, or as an alternative, to the other speech characteristic determining techniques disclosed herein.

Figure 19:
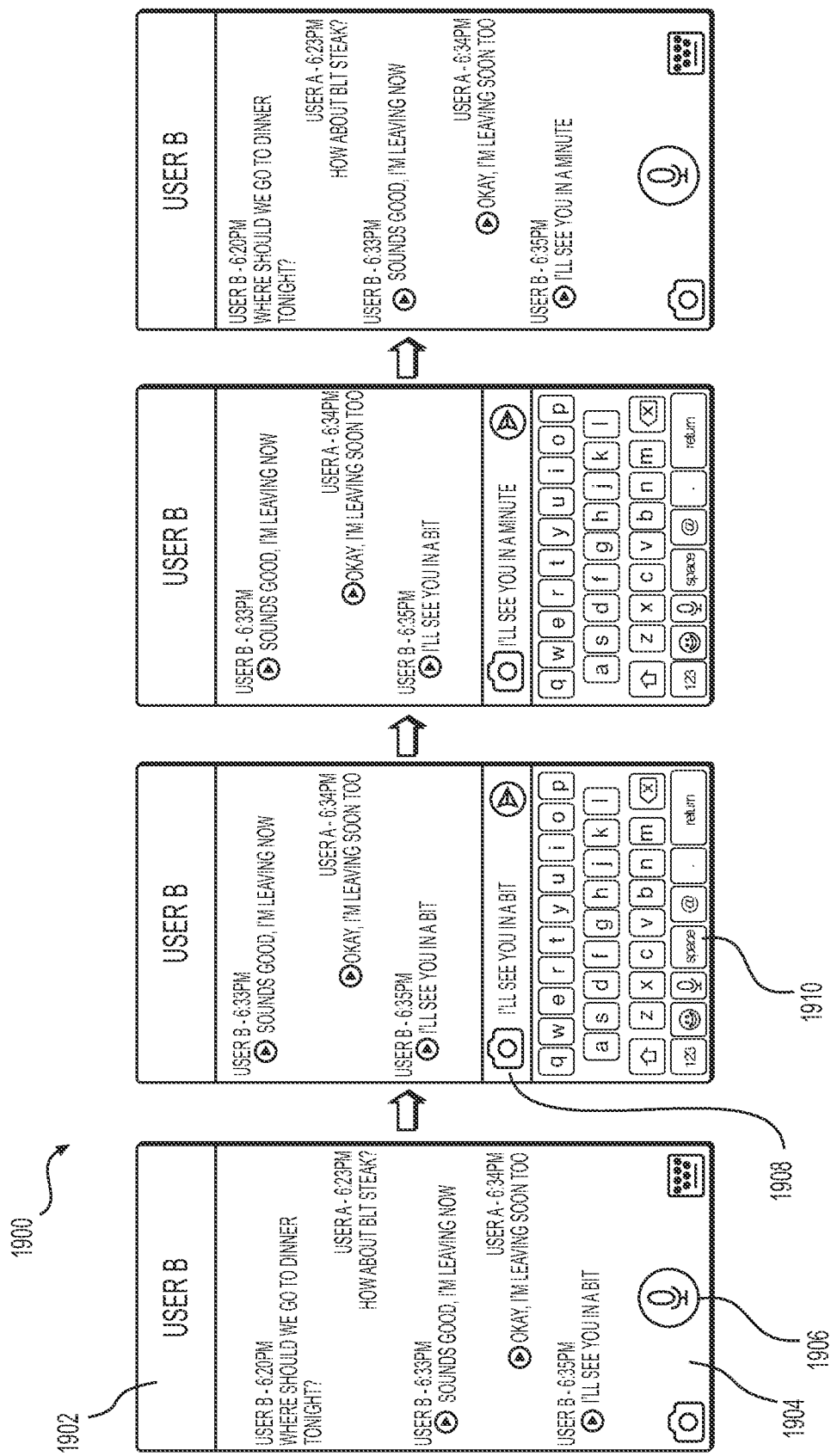
FIG. 19 illustrates an example user interface depicting editing of a transcription.

FIG. 19 illustrates an example user interface 1900 depicting editing of a transcription. The user interface 1900 may include some or all the features of the user interface 1100. For example, the user interface 1900 may include a header window 1902, a messaging window 1904, and a recording icon 1906. The user interface 1900 may also provide editing functionality. In examples, a user may select a text message and/or transcription for editing. The text of the text message and/or transcription may be presented in a text input window 1908 along with a keyboard 1910. The user may utilize the keyboard 1910 to edit the text message and/or transcription. The edited text message and/or transcription may be presented in the text input window 1908 while editing is in progress. The edited message may then be displayed in the message string in place of the original message. The edited message may be displayed on the user's device and/or on the recipient's device.

The system and methods described herein may include additional features to facilitate messaging between users. The additional features may include animation of the selection of icons, messages, and transcriptions. The animations may provide a visual indication to the user that his or her selection is being processed, for example. The animations may be based on one or more cubic-bezier curves.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, from a first device and at a second device, first audio data corresponding to user speech in a first language, the user speech including a request to output a message in a second language;
receiving, from the first device and at the second device, second audio data corresponding to the message in the first language;
generating, at the second device and based at least in part on the request to output the message in the second language, third audio data representing a translation of the message to the second language;
generating, at the second device, a command configured to cause:
the second device to output audio corresponding to the third audio data; and
the second device to output a transcription of the third audio data while the audio is being output by the second device; and
based at least in part on generating the command, displaying a conversation user interface including:
the translation within a conversation between the first device and the second device, the conversation including one or more additional messages sent between the first device and the second device; and
a user interface element configured to, when selected, cause output of the third audio data utilizing the command, the user interface element positioned in the conversation user interface to show an association between the user interface element and the translation.

2. The method of claim 1, wherein the user speech comprises first user speech, the translation comprises a first translation, and the method further comprises:
receiving, at the second device, fourth audio data corresponding to second user speech in the second language;
based at least in part on data indicating that the first user speech was in the first language, generating fifth audio data representing a second translation of the second user speech to the first language; and
sending the fifth audio data to the first device.

3. The method of claim 1, further comprising:
determining that the first audio data represents the request to output the message in the second language based at least in part on speech processing performed on the first audio data; and
storing data representing the request in association with account data associated with the first device and the second device.

4. The method of claim 1, further comprising:
receiving input data, from the first device, indicating that the user speech is to be associated with the request; and
wherein receiving the first audio data is based at least in part on the input data.

5. The method of claim 1, further comprising:
determining, based at least in part on account data associated with the second device, that the second language corresponds to a predesignated language for translations output via the second device; and
wherein generating the third audio data in the second language is based at least in part on the second language corresponding to the predesignated language.

6. The method of claim 1, further comprising:
receiving an indication of a geographic location associated with the first device;
determining that the geographic location is associated with the second language; and
wherein generating the third audio data in the second language is based at least in part on the geographic location being associated with the second language.

7. The method of claim 1, wherein the user speech comprises first user speech, the translation comprises a first translation, and the method further comprises:
   receiving, at the second device, fourth audio data corresponding to second user speech in the second language;
   based at least in part on data indicating that the first user speech was in the first language, generating a second translation of the second user speech to the first language; and
   causing display of the second translation on the second device.

8. The method of claim 1, wherein the user speech comprises first user speech, the translation comprises a first translation, and the method further comprises:
   receiving input data, at the second device, indicating that an audible response to the message is to be captured; and
   generating fourth audio data, at the second device, representing the audible response based at least in part on receiving the input data.

9. The method of claim 1, wherein the first device is associated with account data of a user and the second device is associated with the account data of the user.

10. A system comprising:
    one or more processors; and
    non-transitory computer-readable media storing instructions that, when executed by the one or more processors, cause the one or more processors to perform operations comprising:
      receiving, from a first device and at a second device, first audio data corresponding to user speech in a first language, the user speech including a request to output a message in a second language;
      receiving, from the first device and at the second device, second audio data corresponding to the message in the first language;
      generating, at the second device and based at least in part on the request to output the message in the second language, third audio data representing a translation of the message to the second language; and
      generating, at the second device, a command configured to cause:
        the second device to output audio corresponding to the third audio data;
        the second device to output a transcription of the third audio data while the audio is being output by the second device; and
      based at least in part on generating the command, displaying a conversation user interface including:
        the translation within a conversation between the first device and the second device, the conversation including one or more additional messages sent between the first device and the second device; and
        a user interface element configured to, when selected, cause output of the third audio data utilizing the command, the user interface element positioned in the conversation user interface to show an association between the user interface element and the translation.

11. The system of claim 10, wherein the user speech comprises first user speech, the translation comprises a first translation, and the operations further comprise:
    receiving, at the second device, fourth audio data corresponding to second user speech in the second language;
    based at least in part on data indicating that the first user speech was in the first language, generating fifth audio data representing a second translation of the second user speech to the first language; and
    sending the fifth audio data to the first device.

12. The system of claim 10, the operations further comprising:
    determining that the first audio data represents the request to output the message in the second language based at least in part on speech processing performed on the first audio data; and
    storing data representing the request in association with account data associated with the first device and the second device.

13. The system of claim 10, the operations further comprising:
    receiving input data, from the first device, indicating that the user speech is to be associated with the request; and
    wherein receiving the first audio data is based at least in part on the input data.

14. The system of claim 10, the operations further comprising:
    determining, based at least in part on account data associated with the second device, that the second language corresponds to a predesignated language for translations output via the second device; and
    wherein generating the third audio data in the second language is based at least in part on the second language corresponding to the predesignated language.

15. The system of claim 10, the operations further comprising:
    receiving an indication of a geographic location associated with the first device;
    determining that the geographic location is associated with the second language; and
    wherein generating the third audio data in the second language is based at least in part on the geographic location being associated with the second language.

16. The system of claim 10, wherein the user speech comprises first user speech, the translation comprises a first translation, and the operations further comprise:
    receiving, at the second device, fourth audio data corresponding to second user speech in the second language;
    based at least in part on data indicating that the first user speech was in the first language, generating a second translation of the second user speech to the first language; and
    causing display of the second translation on the second device.

17. The system of claim 10, wherein the user speech comprises first user speech, the translation comprises a first translation, and the operations further comprise:
    receiving input data, at the second device, indicating that an audible response to the message is to be captured; and
    generating fourth audio data, at the second device, representing the audible response based at least in part on receiving the input data.

18. The system of claim 10, wherein the first device is associated with account data of a user and the second device is associated with the account data of the user.

19. The method of claim 1, wherein the user interface element is one of multiple user interface elements associated with other translated audio displayed via the conversation user interface.

20. The system of claim 10, wherein the user interface element is one of multiple user interface elements associated with other translated audio displayed via the conversation user interface.

* * * * *